(12) United States Patent
Tweedy

(10) Patent No.: US 11,981,485 B2
(45) Date of Patent: *May 14, 2024

(54) THREADED TUBULAR END PROTECTOR

(71) Applicant: Tweedy's Speed Protectors, LLC, Eufaula, OK (US)

(72) Inventor: Neil E. Tweedy, Henryetta, OK (US)

(73) Assignee: Tweedy's Speed Protectors, LLC, Eufaula, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/138,950

(22) Filed: Apr. 25, 2023

(65) Prior Publication Data

US 2023/0373697 A1 Nov. 23, 2023

Related U.S. Application Data

(63) Continuation of application No. 17/885,064, filed on Aug. 10, 2022, now Pat. No. 11,667,445, which is a
(Continued)

(51) Int. Cl.
*F16L 57/00* (2006.01)
*B65D 59/04* (2006.01)

(52) U.S. Cl.
CPC ............ *B65D 59/04* (2013.01); *F16L 57/005* (2013.01)

(58) Field of Classification Search
CPC ......... F16L 35/00; F16L 35/005; B65D 59/06
(Continued)

(56) References Cited

U.S. PATENT DOCUMENTS 676,976 A 6/1901 Bossert
1,457,882 A 6/1923 Shrum
(Continued)

FOREIGN PATENT DOCUMENTS

DE 2840742 A1 3/1980

OTHER PUBLICATIONS

PCT/US2021/039400; "International Search Report and Written Opinion"; mailed Oct. 6, 2021; 10 pages.
(Continued)

*Primary Examiner* — Patrick F Brinson
(74) *Attorney, Agent, or Firm* — Hall Estill Law Firm

(57) ABSTRACT

A thread protector that has an external sleeve to protect threads disposed on a tubular member. The thread protector includes a flange disposed on a first end of the external sleeve to be engageable with an end of the tubular member. The thread protector also includes a securing apparatus extending from the flange to frictionally engage an inner side of the tubular member to maintain the thread protector's engagement with the tubular member, the securing apparatus including a magnet that increases the force of the frictional engagement of the securing apparatus with the inner side of the tubular member. The securing apparatus can also extend from the flange to frictionally engage an inner side of the tubular member to maintain the thread protector's engagement with the tubular member, the securing apparatus rotatable relative to the external sleeve. A method of protecting pin threads of pin ends of tubular members by installing a thread protector on an end of a tubular member.

18 Claims, 20 Drawing Sheets

Related U.S. Application Data continuation-in-part of application No. 17/718,015, filed on Apr. 11, 2022, now Pat. No. 11,473,715, which is a continuation-in-part of application No. 17/517,303, filed on Nov. 2, 2021, now Pat. No. 11,454,344, which is a continuation-in-part of application No. 17/360,641, filed on Jun. 28, 2021, now Pat. No. 11,313,503.

(60) Provisional application No. 63/045,317, filed on Jun. 29, 2020.

(58) Field of Classification Search
 USPC .............................................. 138/96 T, 96 R
 See application file for complete search history.

(56) References Cited

U.S. PATENT DOCUMENTS

| | | | |
|---|---|---|---|
| 1,600,860 A | 9/1926 | Young | |
| 1,639,814 A | 8/1927 | Shrum | |
| 1,692,710 A | 11/1928 | Spahn | |
| 1,774,569 A | 9/1930 | Shrum | |
| 1,785,985 A | 12/1930 | Shrum | |
| 2,156,169 A | 4/1939 | Unke | |
| 2,810,401 A | 10/1957 | Stansbury | |
| 2,898,944 A | 11/1959 | Seward et al. | |
| 2,977,993 A | 4/1961 | Scherer | |
| 3,744,528 A | 10/1973 | Vestal | |
| 4,036,261 A | 7/1977 | Hauk | |
| 4,185,665 A | 1/1980 | Flimon | |
| 4,210,179 A | 7/1980 | Galer | |
| 4,733,888 A | 3/1988 | Toelke | |
| 5,148,835 A | 9/1992 | Clark | |
| 5,303,743 A | 4/1994 | Vincent | |
| 5,706,860 A | 1/1998 | Gonyea | |
| 6,196,270 B1 | 3/2001 | Richards et al. | |
| 9,151,432 B1 | 10/2015 | Yoder | |
| 9,546,029 B1 | 1/2017 | Keevert | |
| 9,631,666 B1 | 4/2017 | Colford | |
| 9,828,150 B2 * | 11/2017 | Danneffel | B65D 59/06 |
| 10,274,123 B2 * | 4/2019 | Danneffel | F16L 57/06 |
| 2005/0166986 A1 | 8/2005 | Dell'Erba et al. | |
| 2014/0261849 A1 | 9/2014 | Danneffel et al. | |
| 2015/0034197 A1 | 2/2015 | Schneider et al. | |
| 2016/0039585 A1 | 2/2016 | Danneffel et al. | |
| 2019/0368281 A1 | 12/2019 | Haggart | |
| 2022/0057033 A1 | 2/2022 | Tweedy | |

OTHER PUBLICATIONS

PCT/US2021/059821; "International Search Report and Written Opinion"; mailed Mar. 24, 2022; 13 pages.

* cited by examiner

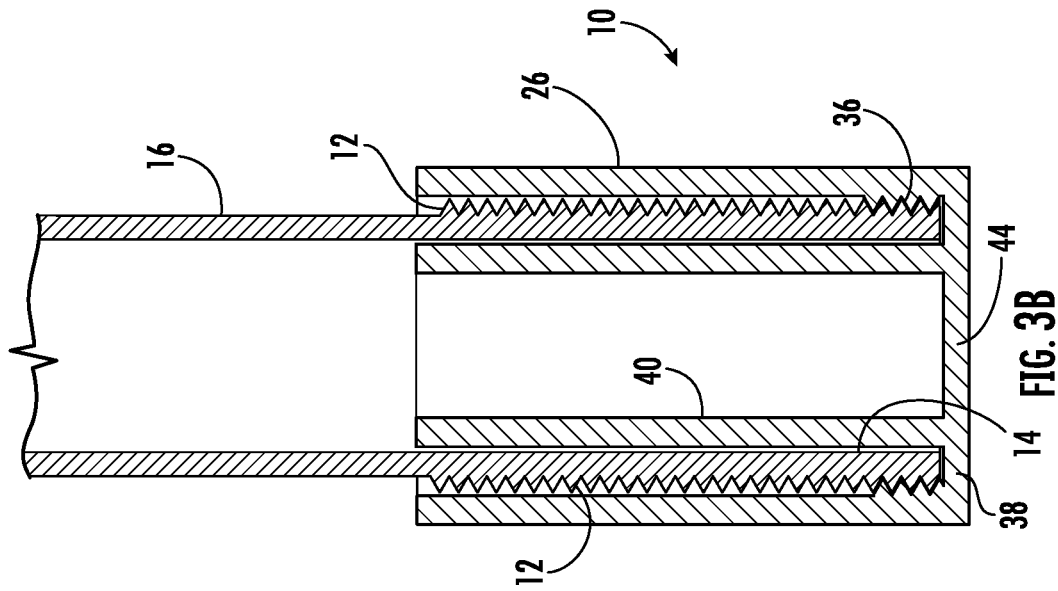
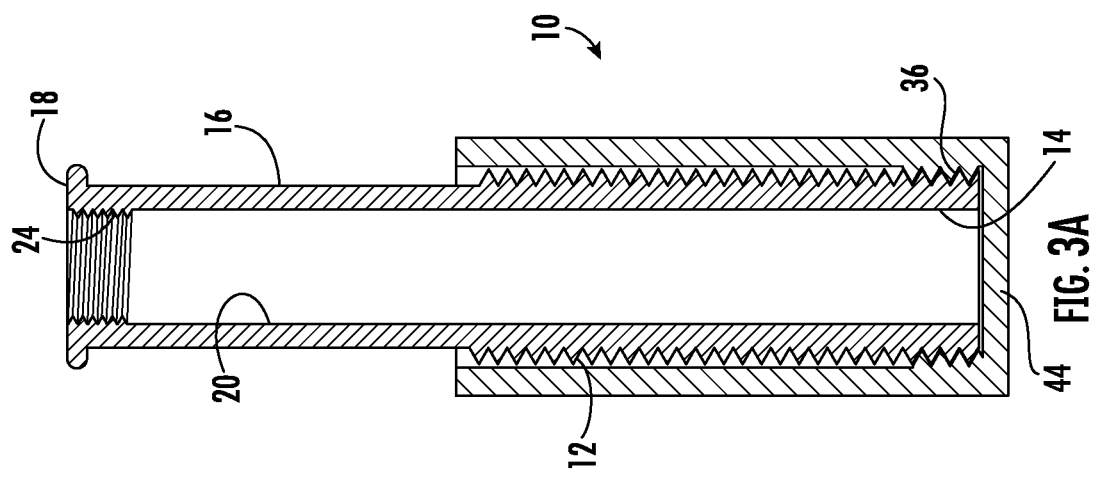

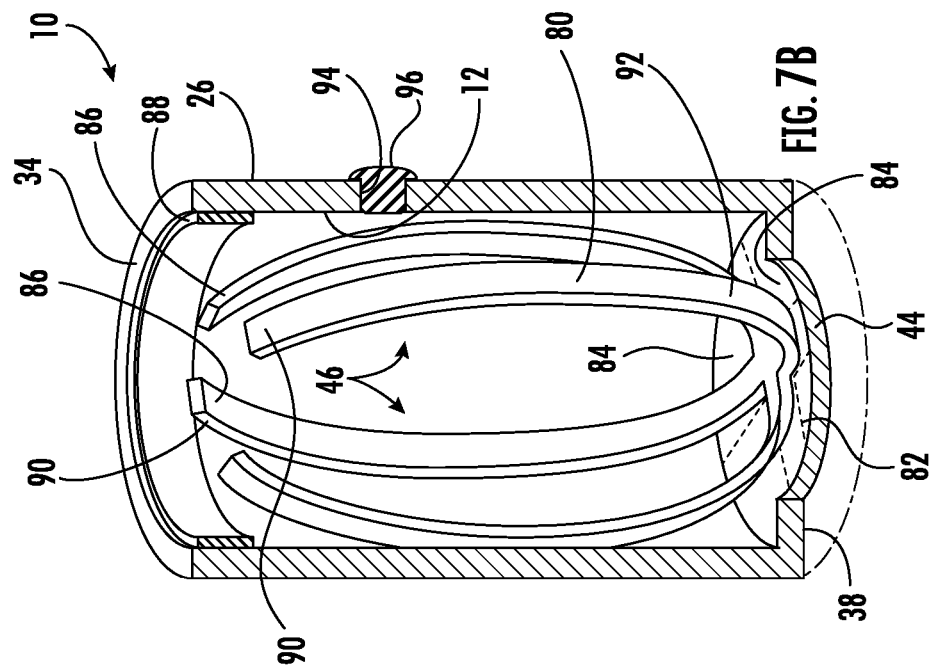
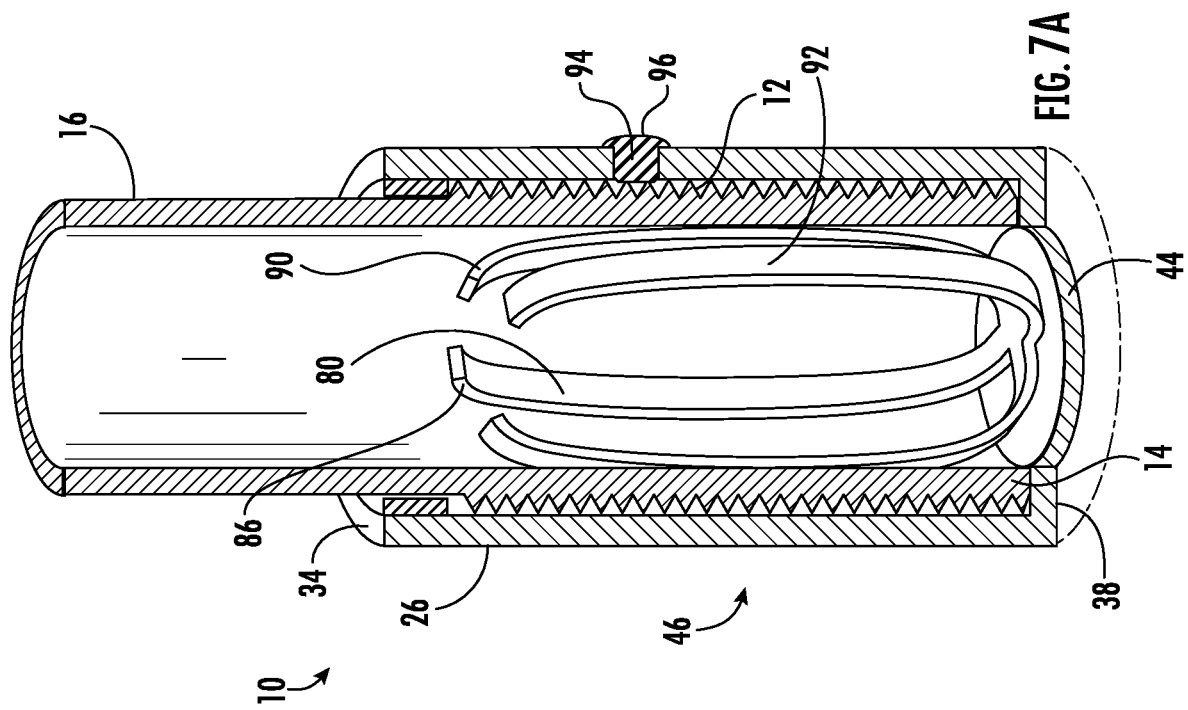

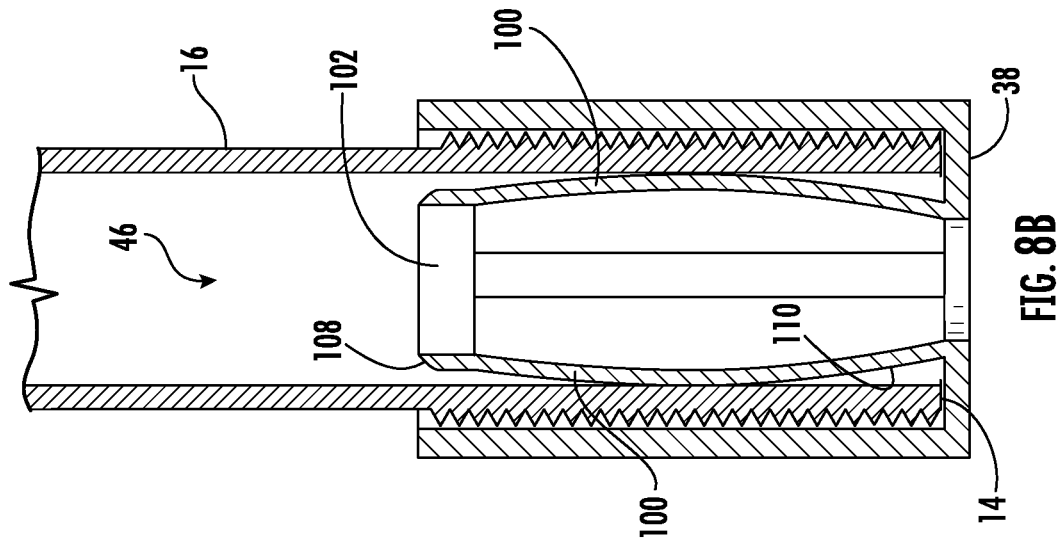
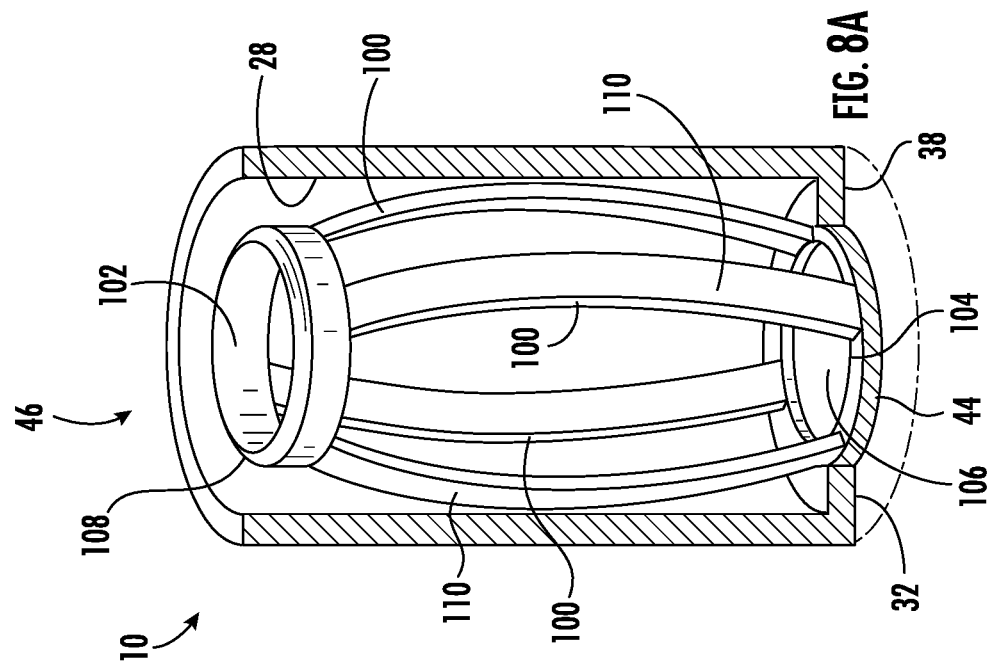

THREADED TUBULAR END PROTECTOR

CROSS-REFERENCE TO RELATED APPLICATIONS

The present application is a continuation application of U.S. patent application having U.S. Ser. No. 17/885,064, filed Aug. 10, 2022, which is a continuation-in-part application of U.S. patent application having U.S. Ser. No. 17/718,015, filed Apr. 11, 2022, which is a continuation-in-part application of U.S. patent application having U.S. Ser. No. 17/517,303, filed Nov. 2, 2021, which is a continuation-in-part application of U.S. patent application having U.S. Ser. No. 17/360,641, filed Jun. 28, 2021, which is a conversion of U.S. Provisional application having U.S. Ser. No. 63/045,317, filed Jun. 29, 2020, which claims the benefit under 35 U.S.C. 119(e). The disclosure of which is hereby expressly incorporated herein by reference.

STATEMENT REGARDING FEDERALLY SPONSORED RESEARCH OR DEVELOPMENT

Not applicable.

BACKGROUND OF THE DISCLOSURE

1. Field of the Disclosure

The present disclosure relates to a thread protector for a threaded end of a unit of casing or tubing that can be quickly attached to and removed from the unit of casing or tubing. The present disclosure also relates to a method of attaching or removing the thread protectors from the pin end of the units of casing or tubing.

2. Description of the Related Art

Casing and/or tubing have a pin end and a box end. The box end includes threads inside, which are naturally protected by being disposed inside the tubing or casing. The pin end has threads on the outside of the tubing or casing that are exposed and can be damaged. Currently, there are protective devices for the pin end threads of the tubing or casing but they take a considerable amount of time to put on the tubing or casing and remove from the tubing or casing. When you multiply the time it takes to put on or remove a typical protector device from the pin end threads of multiple units of tubing or casing, it results in a large amount of time. This large amount of time is taken directly from production time of an oil or gas well.

Accordingly, there is a need for a thread protector for the threads of the pin end of the tubing or casing that can be more quickly placed on and/or removed from the pin end of the tubing or casing, but still protects all the threads of the pin end of the tubing or casing.

SUMMARY OF THE DISCLOSURE

The present disclosure is directed toward a thread protector that has an external sleeve to protect threads disposed on a tubular member. The thread protector includes a flange disposed on a first end of the external sleeve to be engageable with an end of the tubular member. The thread protector also includes a securing apparatus extending from the flange to frictionally engage an inner side of the tubular member to maintain the thread protector's engagement with the tubular member, the securing apparatus including a magnet that increases the force of the frictional engagement of the securing apparatus with the inner side of the tubular member.

The present disclosure is directed toward a thread protector that has an external sleeve to protect threads disposed on a tubular member. The thread protector includes a flange disposed on a first end of the external sleeve to be engageable with an end of the tubular member. The thread protector also includes a securing apparatus extending from the flange to frictionally engage an inner side of the tubular member to maintain the thread protector's engagement with the tubular member, the securing apparatus rotatable relative to the external sleeve.

The present disclosure is also directed toward a method of protecting pin threads of pin ends of tubular members. The method includes installing a thread protector on an end of a tubular member.

BRIEF DESCRIPTION OF THE DRAWINGS

FIG. 3A is a cross-sectional view of yet another embodiment of the thread protector constructed in accordance with the present disclosure.

FIG. 3B is a cross-sectional view of a further embodiment of the thread protector constructed in accordance with the present disclosure.

FIG. 7A is a perspective view of a portion of yet another embodiment of a thread protector constructed in accordance with the present disclosure.

FIG. 7B is a perspective view of the embodiment of the thread protector shown in FIG. 7A constructed in accordance with the present disclosure.

FIG. 8A is a perspective view of another embodiment of a thread protector constructed in accordance with the present disclosure.

FIG. 8B is a cross-sectional view of the embodiment of the thread protector shown in FIG. 8A constructed in accordance with the present disclosure.

DETAILED DESCRIPTION OF THE DISCLOSURE

Figure 2:
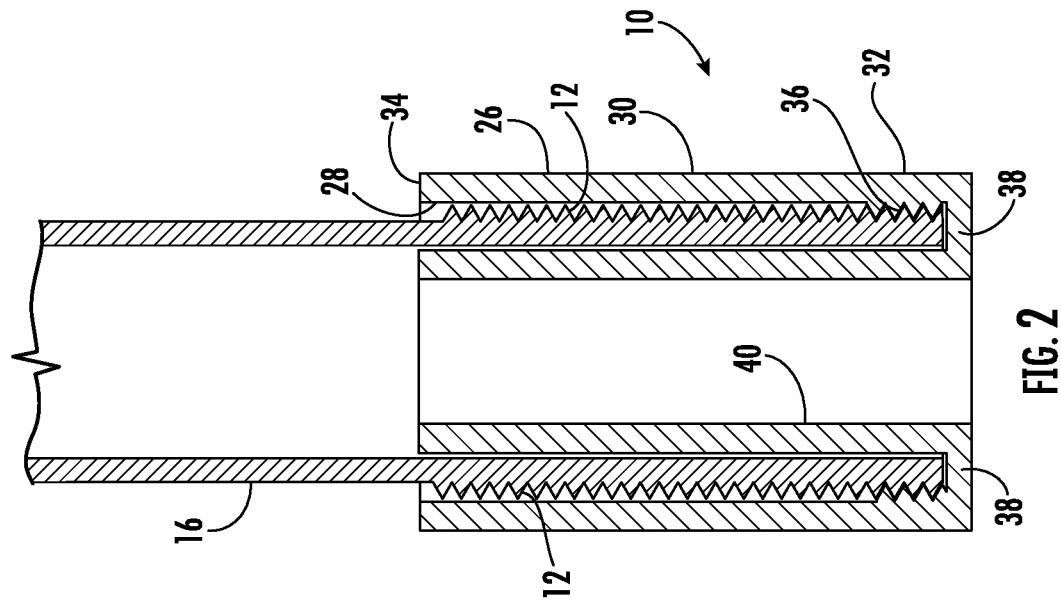
FIG. 2 is a cross-sectional view of another embodiment of the thread protector constructed in accordance with the present disclosure.
Figure 1:
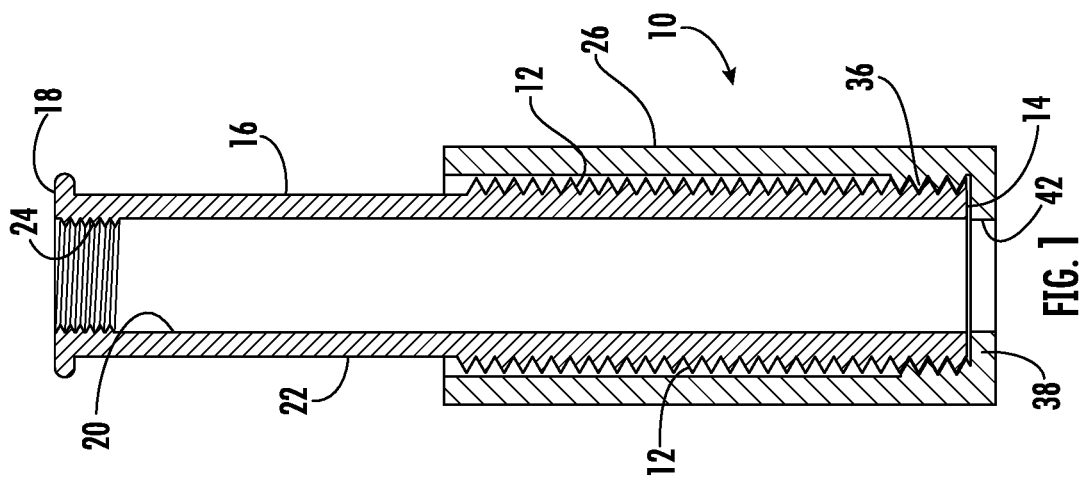
FIG. 1 is a cross-sectional view of a thread protector constructed in accordance with the present disclosure.

The present disclosure is directed to a thread protector 10 to guard or protect threads 12 on a pin end 14 of a tubular member 16. The tubular member 16 can be casing or tubing used in an oil and gas operation. The tubular member 16 also includes a box end 18 opposite the pin end 14, an internal side 20 and an external side 22. The box end 18 of the tubular member 16 includes internal threads 24 disposed therein on the internal side 20 of the tubular member 16. The threads 12 disposed on the external side 22 of the pin end 18 of the tubular member 16 can be a certain number of threads or extend along a certain length of the tubular member 16.

The thread protector 10 includes an external sleeve 26 that is sized to fit around the external side 22 of the tubular member 16 and have a length that is at least as long as the length of the threads 12 disposed on the pin end 14 of the tubular member 14. The external sleeve 26 can have an inner side 28, an outer side 30, a first end 32, and a second end 34. The inner side 28 of the external sleeve 26 can include at least one thread 36 to engage with the threads 12 disposed on the pin end 14 of the tubular member 16.

In one embodiment of the present disclosure, the thread protector 10 can also include a flange 38 inwardly directed in a radial direction from the first end 32 of the thread protector 10. The flange 38 is positioned so that the pin end 14 of the tubular member 16 can engage the flange 38 to maintain the thread protector 10 in a protective position with respect to the threads 12 on the pin end 14 of the tubular member 16. In another embodiment, an internal sleeve 40 can extend from an inner diameter 42 of the flange 38 in the same direction of the external sleeve 26 of the thread protector 10. The internal sleeve 40 is sized to extend back into the inside of the tubular member 16 to provide additional structural support for the thread protector 10. In another embodiment, a plate 44 can be attached to the first end 32 of the external sleeve 26 instead of the flange 38 to prevent debris from getting inside the tubular member 16 when the tubular member 16 is not in use.

The inner side 28 of the external sleeve 26 of the thread protector 10 can have any number of consecutive threads such that the thread protector 10 can be quickly removed and/or replaced from the tubular member 16. The threads 12 disposed on the inner side 28 of the external sleeve 26 of the thread protector 10 are positioned close to the flange 38 of the thread protector 10 so that when the thread protector 10 engages with the threads 12 of the pin end 14, the threads 12 of the thread protector 10 only engage with the threads 12 at the end of the pin end 14 of the tubular member 16. If a limited number of the threads on the tubular member 16 are engaged to secure the thread protector 10 thereto, then the reduction in time it would take to remove the thread protector 10 from the tubular member 16, and the time it would take to secure the thread protector 10 to the tubular member 16, when combined for numerous tubular members, would be significant.

In one embodiment, the number of threads 12 on the inner side 28 of the external sleeve 26 of the thread protector 10 can be less than ten threads. In another embodiment, the number of threads 12 on the inner side 28 of the external sleeve 26 of the thread protector 10 can be less than eight threads. In a further embodiment, the number of threads 12 on the inner side 28 of the external sleeve 26 of the thread protector 10 can be less than 6 threads. In yet another embodiment, the number of threads 12 on the inner side 28 of the external sleeve 26 of the thread protector 10 can be less than 4 threads. In another embodiment, the number of threads 12 on the inner side 28 of the external sleeve 26 of the thread protector 10 can be less than 3 threads. In a further embodiment, the number of threads 12 on the inner side 28 of the external sleeve 26 of the thread protector 10 can be less than 2 threads.

The threads 12 on the pin end 14 of the tubular member 16 can extend along a certain length of the tubular member 16. The engaged threads (threads extending from the end of the pin end of the tubular member that are engaged by the threads of the thread protector) extend a certain percentage of the length of all the threads 12 on the pin end 14 of the tubular member 16. In one embodiment, the length of the engaged threads are less than about 40 percent of the total length of all the threads 12 on the pin end 14 of the tubular member 16. In another embodiment, the length of the engaged threads are less than about 30 percent of the total length of all the threads 12 on the pin end 14 of the tubular member 16. In a further embodiment, the length of the engaged threads are less than about 25 percent of the total length of all the threads 12 on the pin end 14 of the tubular member 16. In yet another embodiment, the length of the engaged threads are less than about 20 percent of the total length of all the threads 12 on the pin end 14 of the tubular member 16. In an even further embodiment, the length of the engaged threads are less than about 10 percent of the total length of all the threads 12 on the pin end 14 of the tubular member 16. In another embodiment, the length of the engaged threads are less than about 5 percent of the total length of all the threads 12 on the pin end 14 of the tubular member 16.

Figure 6:
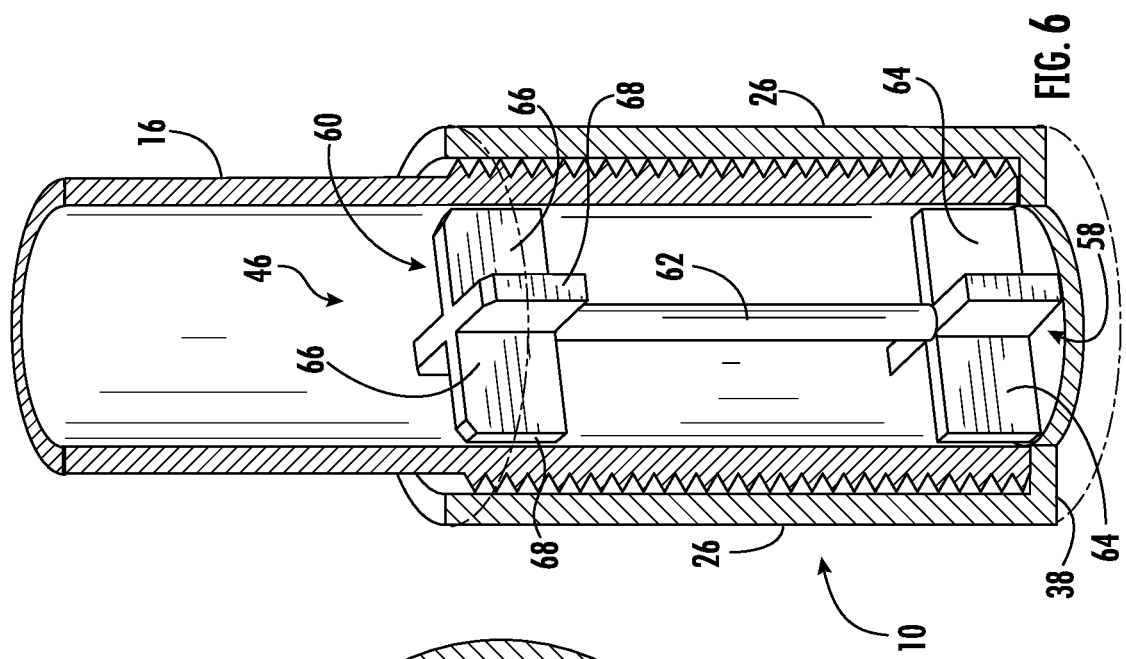
FIG. 6 is a perspective view of a portion of yet another embodiment of a thread protector constructed in accordance with the present disclosure.
Figure 5:
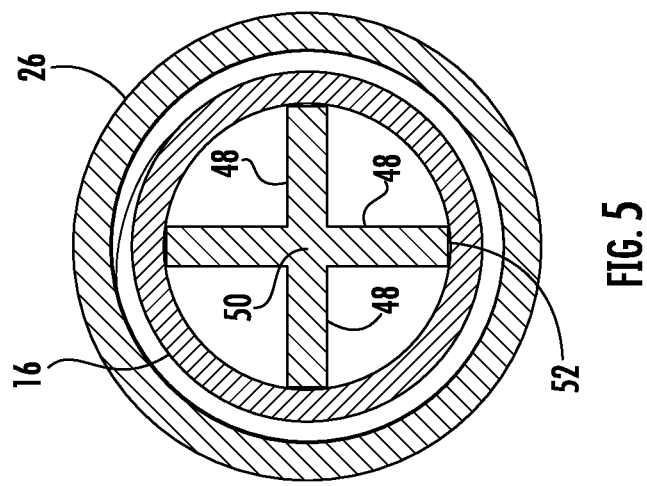
FIG. 5 is a cross-sectional view of the thread protector shown in FIG. 4 and constructed in accordance with the present disclosure.
Figure 4:
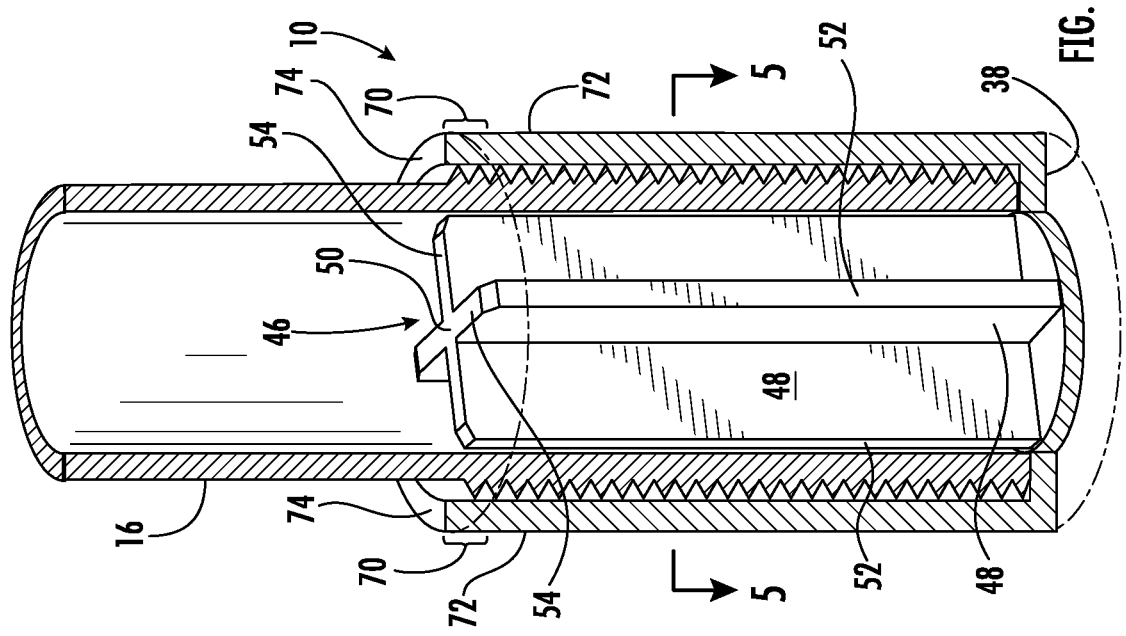
FIG. 4 is a perspective view of a portion of another embodiment of a thread protector constructed in accordance with the present disclosure.

Referring now to FIGS. 4-6, shown therein is a thread protector 10 that has a securing apparatus 46 that can extend inside the tubular member 16 from the flange 38. The securing apparatus 46 can engage with the inside of the tubular member 16 to maintain position of the thread protector 10 relative to the threads 12 of the pin end 14 of the tubular member 16. The securing apparatus 46 can have any size and shape such that it maintains the thread protector 10 in place on the tubular member 16. In one embodiment, the securing apparatus 46 can include a plurality of fins 48 that extend from a central member 50. The fins 48 have outer portions 52 that can engage with the inner side of the tubular member 16. The fins 48 have terminal ends 54 on the opposite ends from the flange 38. The outer portion 52 at the terminal ends 54 of the fins 48 can be tapered so that insertion of the securing apparatus 46 of the thread protector 10 is easier to extend down into the tubular member 16. The length, width and height of the fins 48 can be varied such that the thread protector 10 functions as intended. The securing apparatus 46 can also have any number of fins 48 such that the thread protector 10 functions as intended. In various embodiments, the securing apparatus 46 can have more than two fins 48, more than three fins 48, more than four fins 48 or five or more fins 48.

In another embodiment shown in more detail in FIG. 6, the securing apparatus 46 can have a first spoke end 58 that is attached to the flange 38, a second spoke end 60 that is separated from the first spoke end 58 via a rod member 62. The first and second spoke ends 58 and 60 engage the inside of the tubular member 16 to hold the thread protector 10 securely in place. The first spoke end 58 can have any desired number of spokes 64 so that the thread protector 10 operates as intended. Similarly, the second spoke end 60 can have any desired number of spokes 66 so that the thread protector 10 operates as intended. A portion of the outer surfaces 68 of the spokes 66 can be tapered to facilitate insertion of the securing apparatus 46 into the tubular member 16. The securing apparatus 46 can be used with our without the at least one thread 36 on the inner side 28 of the external sleeve 26 of the thread protector 10. The spoke and fin designs of the securing apparatus 46 allow for visual inspection of the inner part of the tubular member 16 and cleaning of the inside part of the tubular member 16.

In yet another embodiment, the thread protector 10 can have a ridge or lip 70 disposed on an outer surface 72 of the external sleeve 26 close to a terminal end 74 of the external sleeve. The ridge 70 allows for engagement by a band that can extend to the tubular member 16 to help hold the thread protector 10 in position, such as during transportation of the tubular members 16 to and from job sites or while the tubular members 16 are being stored. The band that can be used can extend around the entire circumference of the thread protector 10 and the tubular member. Primarily, ridge 70 prevents the band from sliding off of the thread protector 10 and the band prevents the thread protector 10 from rotating off of the tubular member 16.

Referring now to FIGS. 7A and 7B, shown therein is another embodiment of a thread protector 10 that has a securing apparatus 46 that can extend inside the tubular member 16 from the flange 38. The securing apparatus 46 can engage with the inside of the tubular member 16 to maintain position of the thread protector 10 relative to the threads 12 of the pin end 14 of the tubular member 16. The securing apparatus 46 can have any size and shape such that it maintains the thread protector 10 in place on the tubular member 16. In one embodiment, the securing apparatus 46 can include a plurality of bowed fingers 80 that extend from the flange 38. The bowed fingers 80 are bowed outward towards the inner side 28 of the external sleeve 26 of the thread protector 10.

In another embodiment, the bowed fingers 80 can extend from the plate 44 that can be attached to the first end 32 of the external sleeve 26. When the plate 44 is used, the plate 44 can have weakened sections 82 that permit removable parts 84 of the plate 44 to be removed if desired to expose the inside of the tubular member 16. Terminal ends 86 of the bowed fingers 80 can have angled portions 90 that angle inwards away from the inner side 28 of the external sleeve 26 of the thread protector 10. The angled portions 90 of the bowed fingers 80 allow the thread protector 10 to more easily permit the pin end 14 of the tubular member 16 to slide between the bowed fingers 80 and the external sleeve 26. As the securing apparatus 46 is forced down into the tubular member, the bowed fingers 80 frictionally engage the inner side 28 of the tubular member 16. The engagement of the bowed fingers 80 with the inner side 28 of the tubular member 16 causes the bowed fingers 80 to straighten, which permits more surface area of outer sides 92 of the bowed fingers 80 to contact the inner side 28 of the tubular member 16.

In a further embodiment of the present disclosure, the thread protector 10 can include a debris barrier 88 that is disposed around the inner side 28 of the external sleeve 26 of the thread protector 10 to prevent debris or fluid away from the threads 12 on the pin end 14 of the tubular member 16. The debris barrier 88 can be disposed on the inner side 28 of the external sleeve 26 close to the terminal end 34 or immediately adjacent to the terminal end 34 of the external sleeve 26. When the thread protector 10 is in use, the debris barrier 88 extends from the inner side 28 of the external sleeve 26 of the thread protector 10 to the external side 22, or very close to the external side 22, of the tubular member 16. The debris barrier 88 can be made of any material that prevents debris from passing between itself and the tubular member 16. The debris barrier can be made of a polymeric material that is rigid, flexible or semi-flexible.

The thread protector 10 can also include an opening 94 disposed in the external sleeve 26 for receiving a securing pin 96. In one embodiment, the securing pin 96 can be tapered to permit a narrower end to be stuck through the opening 94 and contact the tubular member 16 to increase the secureness of the thread protector 10 on the tubular member 16. When the tapered securing pin 96 is used, the size of the securing pin 96 is such that the securing pin 96 is securely lodged in the opening 94 when the securing pin 96 is securely positioned against the tubular member 16. In another embodiment, the opening 94 and the securing pin 96 can be threaded wherein the securing pin 96 can be screwed into and through the opening 94 and securely against the tubular member 16 to further secure the thread protector 10 to the tubular member 16. The securing pin 96 can be constructed of a material that is strong enough to engage the tubular member 16 and help secure the thread protector 10 to the tubular member 16. However, if the securing pin 96 is going to engage the threads 12 on the tubular member 16, the securing pin 96 can be constructed of a material that is softer than the material used to construct the tubular member 16. Examples of material for the securing pin 96 include, but are not limited to, a polymeric material (i.e. plastic, rubber, nylon, etc.) and a soft metal.

Referring now to FIGS. 8A and 8B, shown therein is another embodiment of a thread protector 10 that has a securing apparatus 46 that can extend inside the tubular member 16 from the flange 38. In this embodiment, the securing apparatus 46 can include a plurality of bowed fingers 100 that extend from the flange 38 to an insertion ring 102. The bowed fingers 100 are bowed outward towards the inner side 28 of the external sleeve 26 of the thread protector 10. In another embodiment, the bowed fingers 100 can extend from the plate 44 that can be attached to the first end 32 of the external sleeve 26 and extend to the insertion ring 102. When the plate 44 is used, the plate 44 can have weakened sections 104 that permit removable parts 106 of the plate 44 to be removed if desired to expose the inside of the tubular member 16.

The insertion ring 102 can have a tapered portion 108 that angle inwards away from the inner side 28 of the external sleeve 26 of the thread protector 10. The tapered portion 108 can extend around the entire insertion ring 102. The tapered portion 108 of the insertion ring 102 allows the thread protector 10 to more easily permit the pin end 14 of the tubular member 16 to slide between the insertion ring 102 (and the bowed fingers 100) and the external sleeve 26. As the securing apparatus 46 is forced down into the tubular member, the bowed fingers 100 frictionally engage the inner side 28 of the tubular member 16. The engagement of the bowed fingers 100 with the inner side 28 of the tubular member 16 causes the bowed fingers 100 to straighten, which permits more surface area of outer sides 110 of the bowed fingers 100 to contact the inner side 20 of the tubular member 16. In a further embodiment, the securing apparatus 46 can also include a structural ring that exists between the flange 38 or plate 44 and the bowed fingers 100 to provide additional structural support for the securing apparatus 46.

Figure 9B:
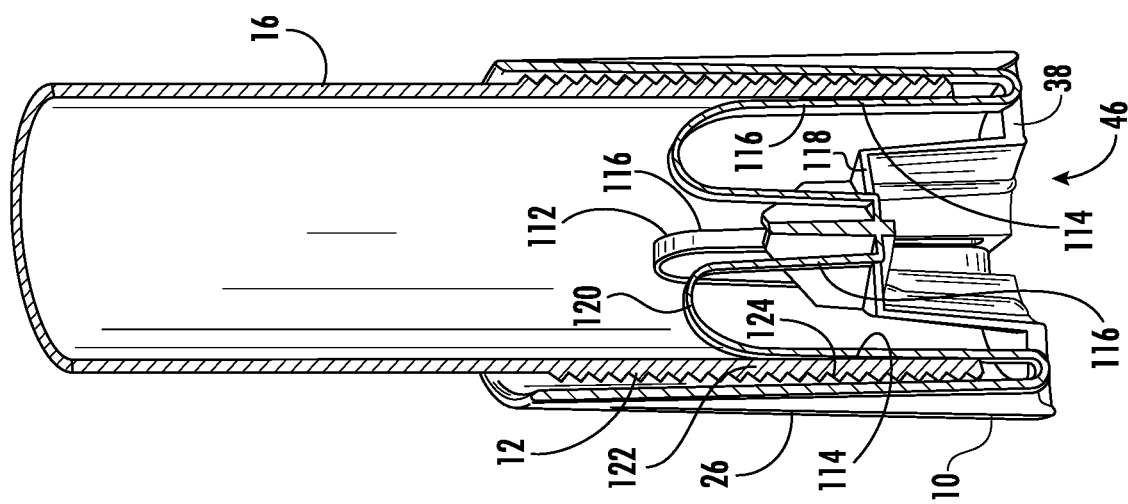
FIG. 9B is a perspective view of the embodiment of the thread protector shown in FIG. 9A constructed in accordance with the present disclosure.
Figure 9A:
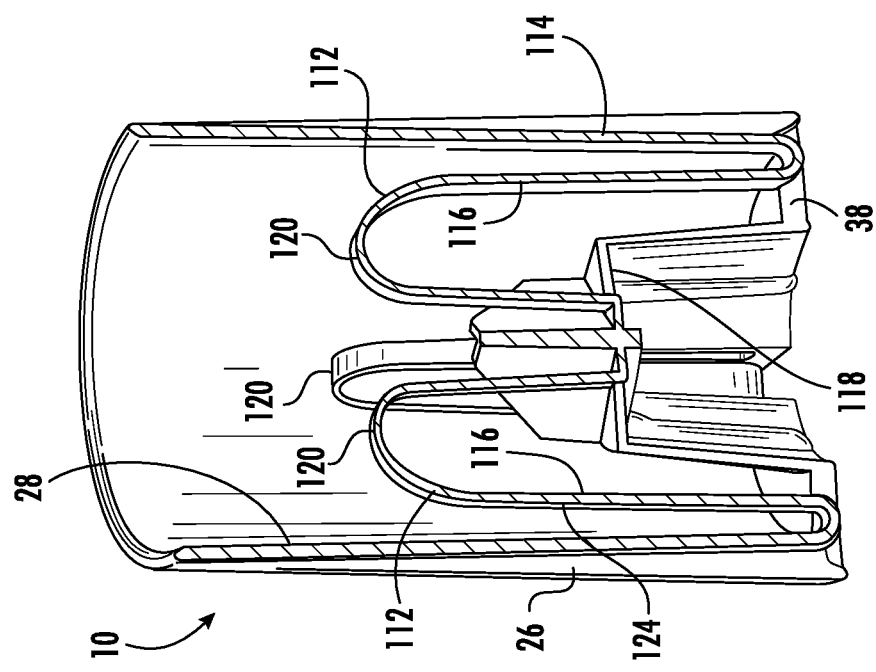
FIG. 9A is a perspective view of a portion of yet another embodiment of a thread protector constructed in accordance with the present disclosure.

Referring now to FIGS. 9A and 9B, shown therein is another embodiment of a thread protector 10 that has a securing apparatus 46 that can extend inside the tubular member 16 from the flange 38. In this embodiment, the securing apparatus 46 can include a plurality of U-shaped fingers 112 that have a first leg 114 that extends from the flange 38 and a second leg 116 that extends from a base portion 118 that also extends from flange 38. The first leg 114 of each U-shaped finger 112 moves further from the internal side 20 of the tubular member 16 as the first leg 114 moves from the flange 38 to a bottom 120 of each U-shaped finger 112. The base portion 118 of the securing apparatus 46 can have any shape desirable such that proper structural support is provided to the plurality of U-shaped fingers 112. The base portion 118 can extend down into the tubular member 16, or the base portion could be a plate that extends within the flange 38.

A pin end 14 of the tubular member 16 can be forced into the thread protector 10 such that a sidewall 122 of the tubular member 16 ends up being positioned between the external sleeve 26 of the thread protector 10 and each U-shaped finger 112. The tapering relationship between the first leg 114 of each U-shaped finger 112 creates a situation where, depending on the thickness of the sidewall 122, the sidewall 122 of the tubular member 16 gets securely wedged between the first leg 114 of each U-shaped finger 112. The tapering relationship and the U-shape of each finger 112 creates a larger distance between the bottom 120 of each U-shaped finger 112 and the inner side 28 of the external sleeve 26, which permits easier initial engagement with the tubular member 16. As the pin end 14 of the tubular member 16 is forced into engagement with the securing apparatus 46 of the thread protector 10, outer surfaces 124 of the first legs 114 of each U-shaped finger are flattened so that more surface area of the outer surfaces 124 can contact the internal side 20 of the tubular member 16 to better secure the thread protector 10 to the tubular member 16.

Figure 10A:
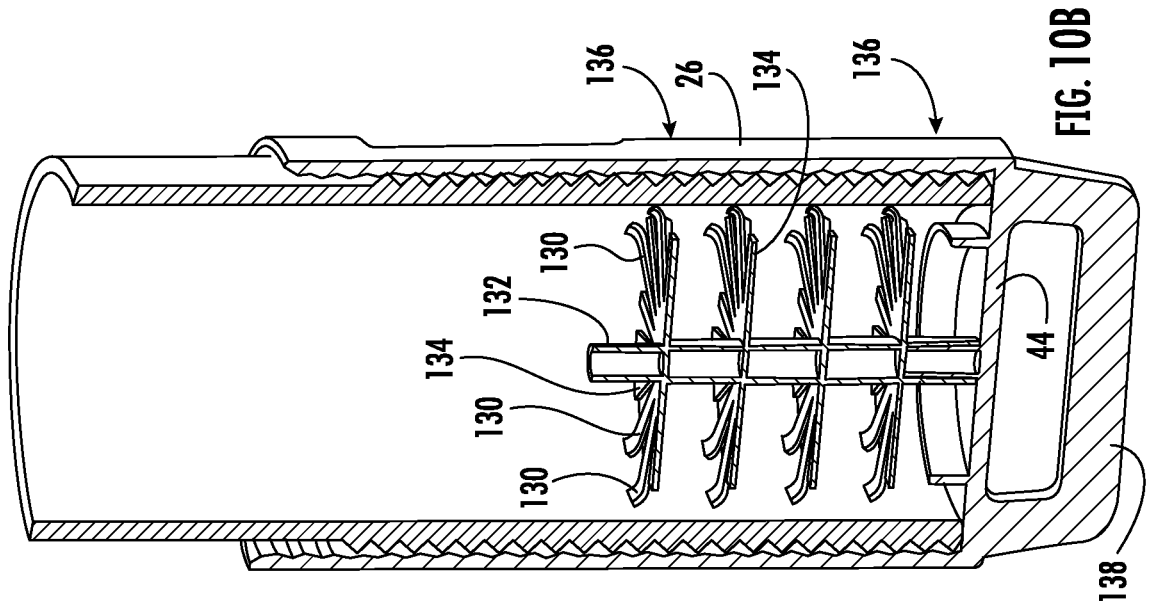
FIG. 10A is a perspective view of another embodiment of a thread protector constructed in accordance with the present disclosure.
Figure 10B:
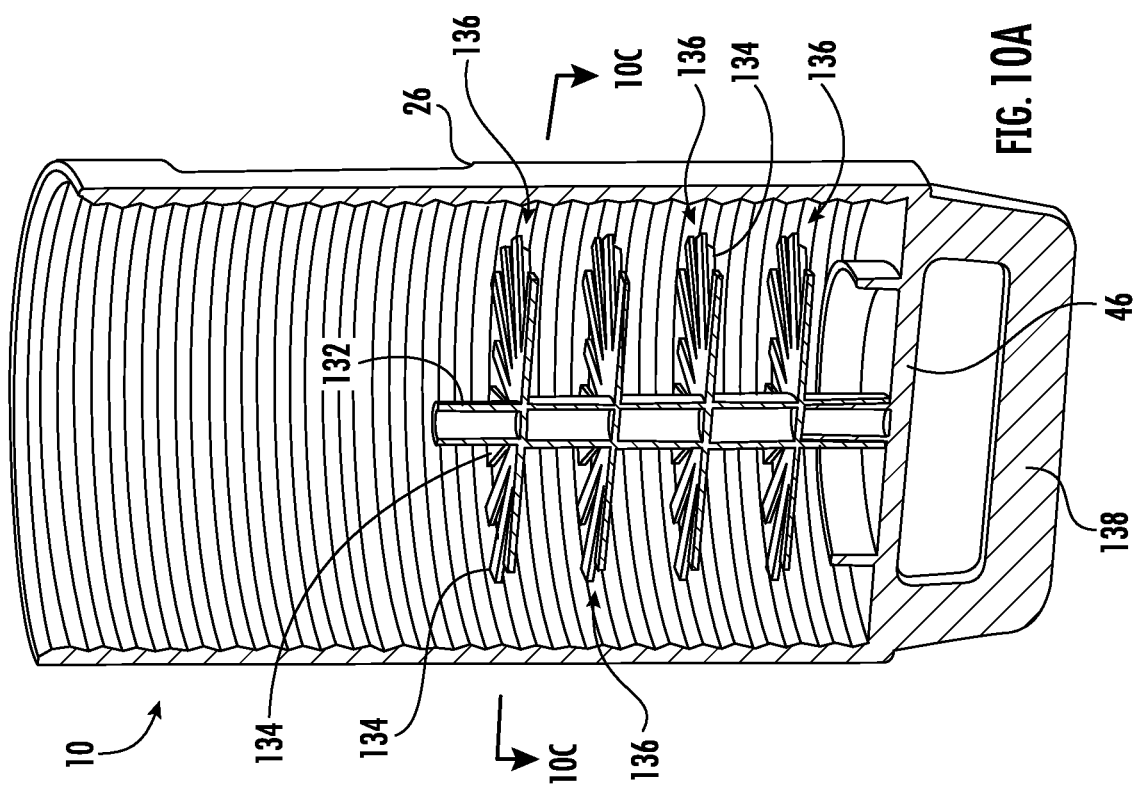
FIG. 10B is a cross-sectional view of the embodiment of the thread protector shown in FIG. 10A constructed in accordance with the present disclosure.
Figure 10C:
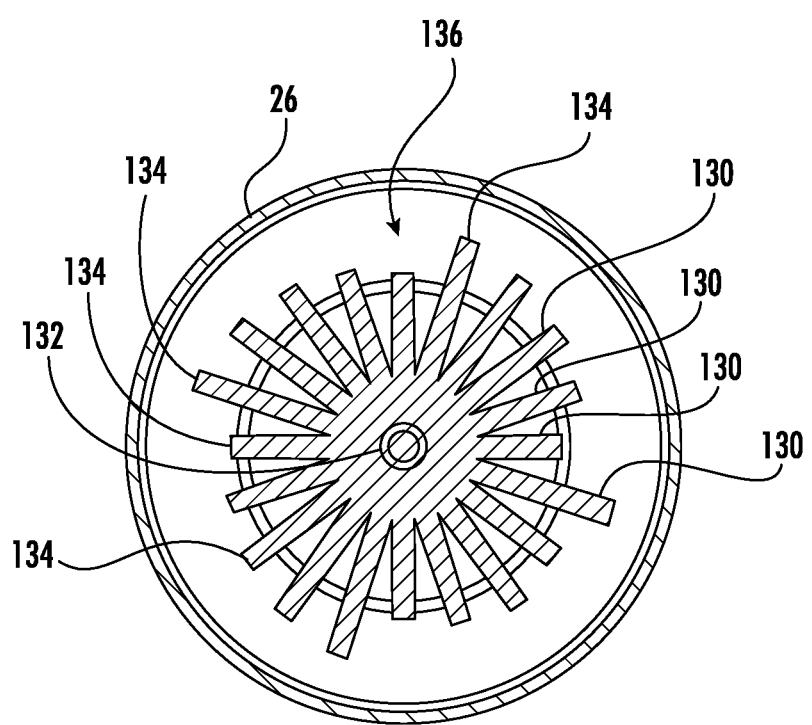
FIG. 10C is a cross-sectional view of a portion of the embodiment of the thread protector shown in FIG. 10A constructed in accordance with the present disclosure.
Figure 11A:
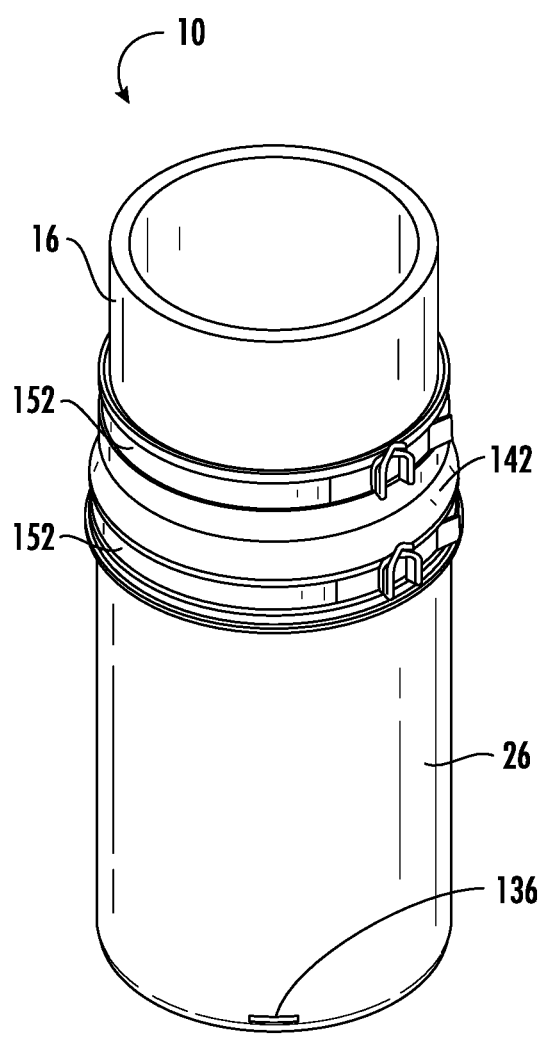
FIG. 11A is a perspective view of another embodiment of a thread protector constructed in accordance with the present disclosure.
Figure 11B:
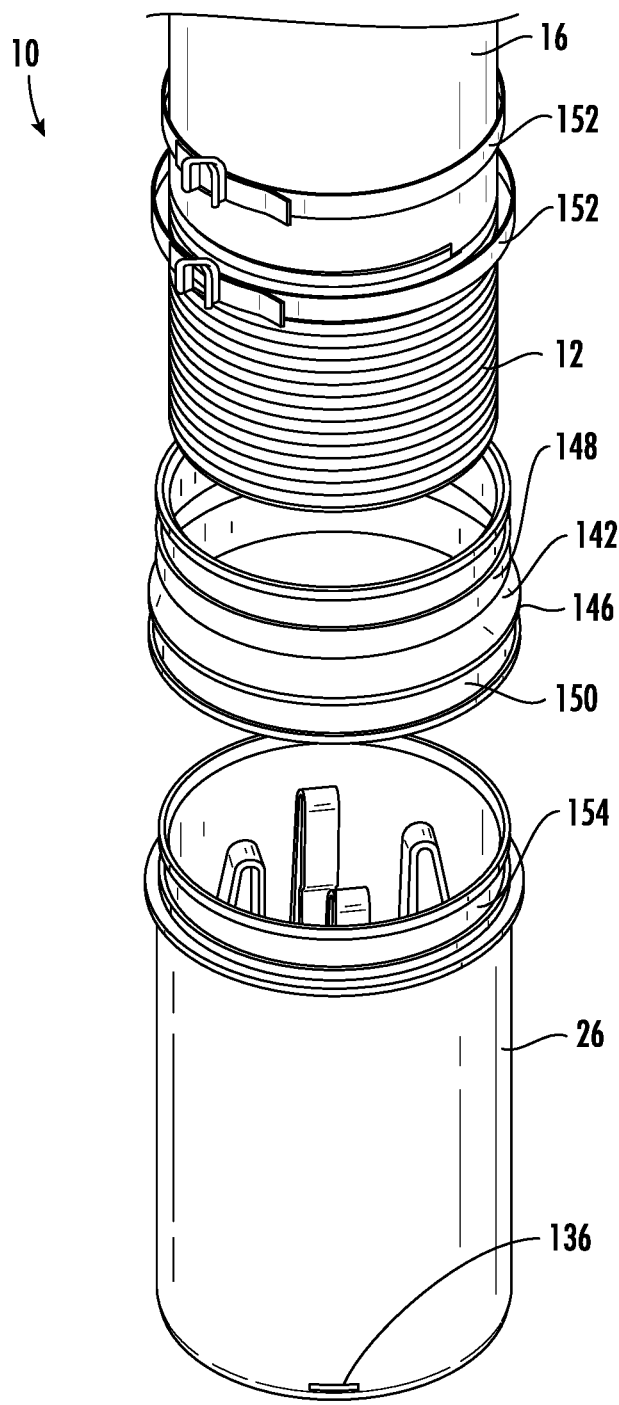
FIG. 11B is an exploded view of the embodiment of the thread protector shown in FIG. 11A constructed in accordance with the present disclosure.
Figure 12A:
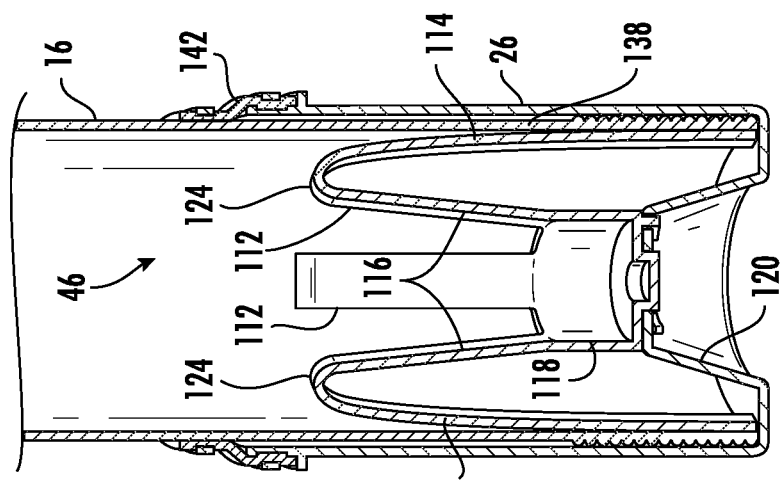
FIGS. 12A-12C are additional views of the thread protector shown in FIGS. 11A and 11B constructed in accordance with the present disclosure.
Figure 12B:
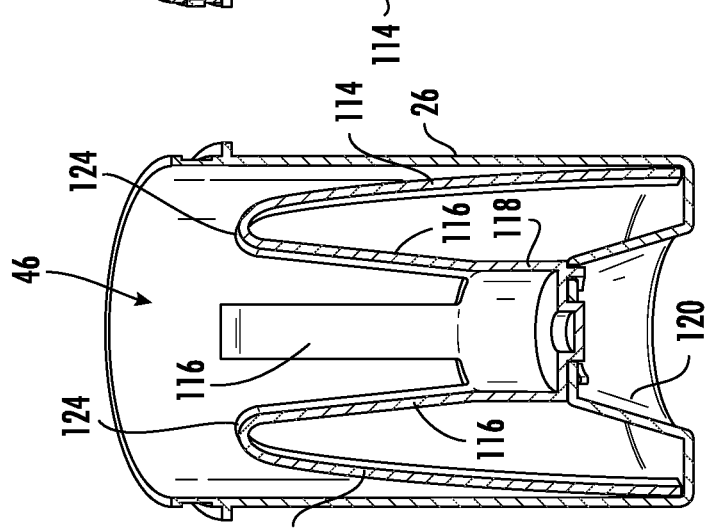
Figure 12C:
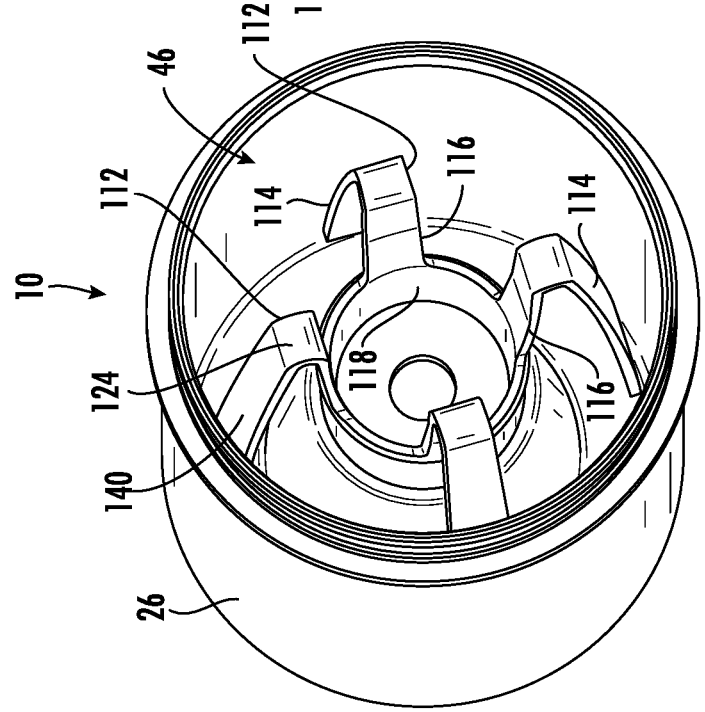
Figure 13A:
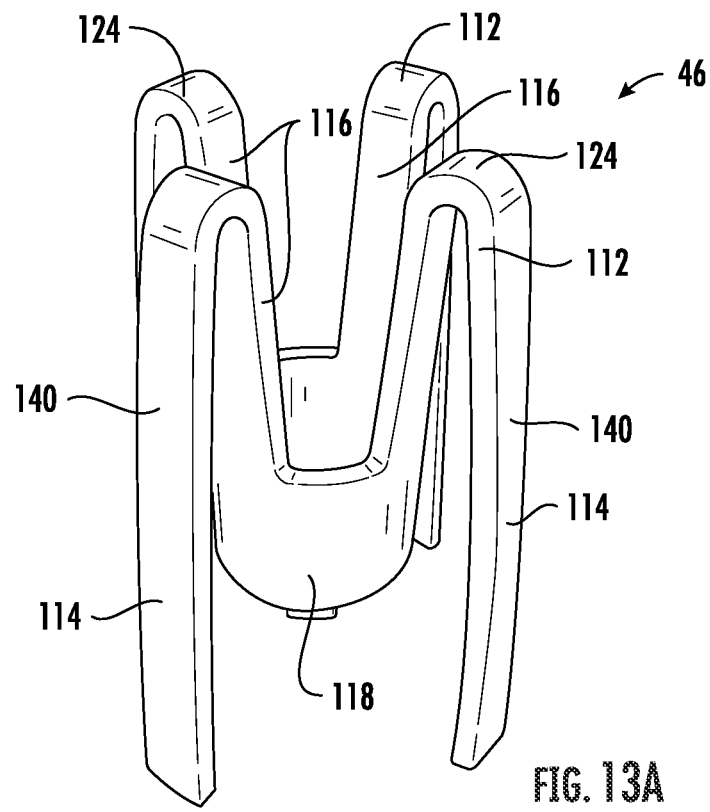
FIGS. 13A and 13B are perspective views of a portion of the thread protector shown in FIGS. 11A and 11B constructed in accordance with the present disclosure.
Figure 13B:
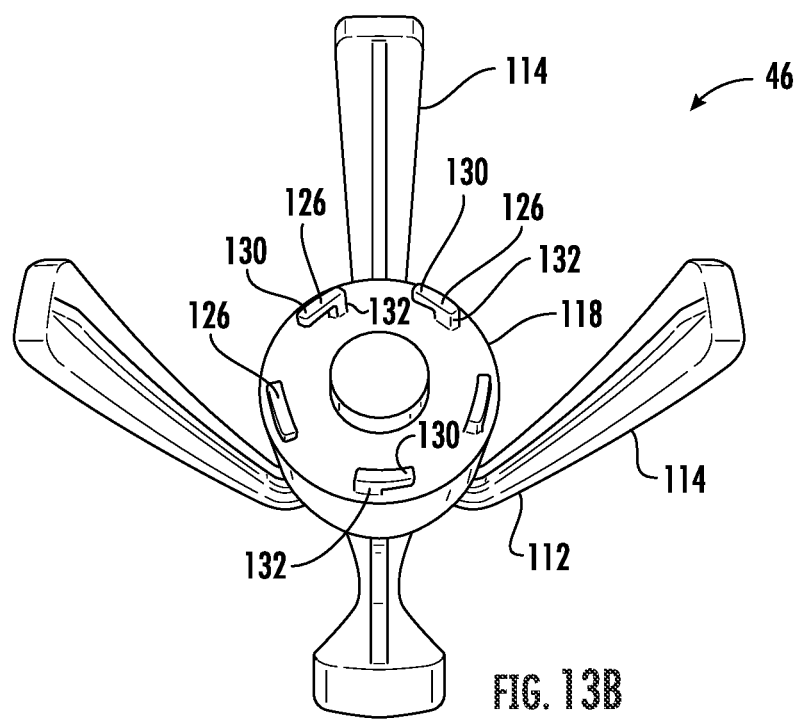
Figure 14A:
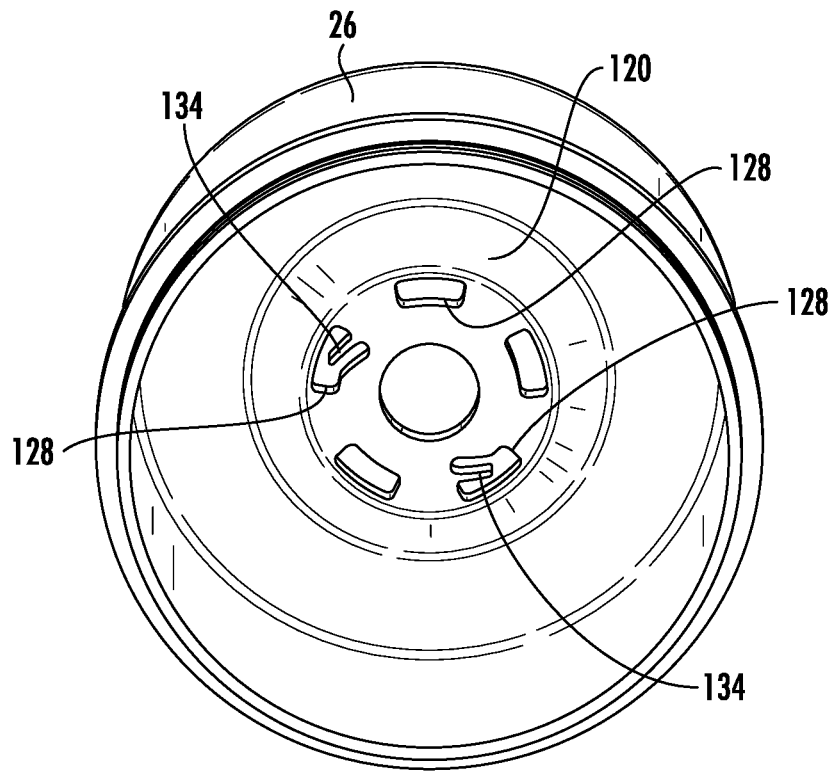
FIGS. 14A and 14B are additional views of another portion of the thread protector shown in FIGS. 11A and 11B constructed in accordance with the present disclosure.
Figure 14B:
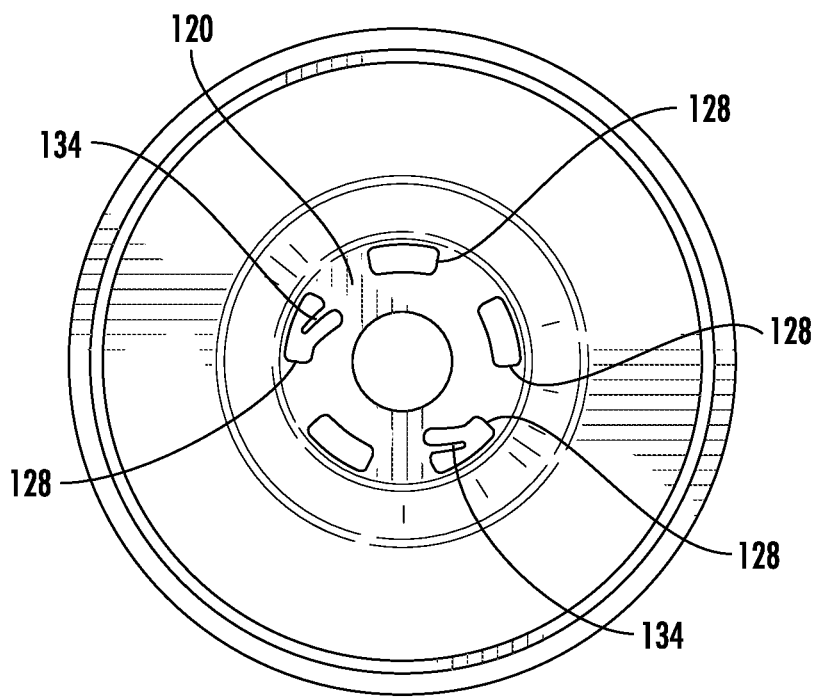

Referring now to FIGS. 10A-10C, shown therein is a thread protector 10 that has a securing apparatus 46 that can extend inside the tubular member 16 from the flange 38 or the plate 44. The securing apparatus 46 can engage with the inside of the tubular member 16 to maintain position of the thread protector 10 relative to the threads 12 of the pin end 14 of the tubular member 16. In this embodiment, the securing apparatus 46 can include a plurality of fins 130 that extend radially from a central member 132. The fins 130 have outer portions 134 that can engage with the inner side of the tubular member 16. The length, width and height of the fins 130 can be varied such that the thread protector 10 functions as intended. The securing apparatus 46 can also have any number of fins 130 such that the thread protector 10 functions as intended. In one embodiment, the securing apparatus 46 can have multiple levels 136 of fins 130 wherein each level 136 of fins 130 can have varied lengths of fins 130. Each fin 130 can also have a varied stiffness. The varied lengths of fins 130 at each level 136 provides engagement capabilities with tubular members 16 of varying sized inner diameters. For example, a wider tubular member 16 with a wider inner diameter would engage with the longer fins 130 of the securing apparatus 46 to secure the thread protector 10 on the tubular member 16. Conversely, a tubular member 16 with a narrower inner diameter would engage with the shorter fins 130 of the securing apparatus 46 to secure the thread protector 10 on the tubular member 16. The thread protector 10 can also include a handle 138 that can be attached in any manner known in the art for helping put on and remove the thread protector 10 on the tubular member 16. In one embodiment, the handle 138 can be attached to the flange 38.

Referring now to FIGS. 11A-14B, shown therein is another embodiment of a thread protector 10 that has a securing apparatus 46 that is selectively securable to the thread protector 10. The securing apparatus 46 can extend inside the tubular member 16. In this embodiment, the securing apparatus 46 can be removable from the thread protector 10 and exchanged with other sized securing apparatuses 46 so that the thread protector 10 can fit multiple size tubular members 16. The securing apparatus 46 can include a plurality of U-shaped fingers 112 that have a first leg 114 that extends toward the flange 38 and a second leg 116 that extends from a base portion 118 of the securing apparatus 46. The base portion 118 of the securing apparatus 46 can be secured to a base member 120 that is supported by the flange 38. The first leg 114 of each U-shaped finger 112 moves further from the internal side 20 of the tubular member 16 as the first leg 114 moves from the direction of the flange 38 to a bottom 124 of each U-shaped finger 112. The base member 120 that engages with the securing apparatus 46 can have any shape desirable such that proper structural support is provided to the plurality of U-shaped fingers 112 of the securing apparatus 46. The base member 120 can extend down into the tubular member 16, or the base member 120 could be a plate that extends within the flange 38.

Engagement between the base portion 118 of the securing apparatus 46 and the base member 120 can be designed such that the securing member 46 can be selectively engaged. This permits different sized securing apparatuses 46 can be used with the thread protector 10 depending on the size of the tubular member 16 having the threads to be protected. The base portion 118 of the securing apparatus 46 can have protrusions 126 that extend therefrom that securely engage with openings 128 disposed in the base member 120. It should be understood that the protrusions could be on the base member 120 and the openings could be disposed in the base portion 118 of the securing apparatus 46. In one embodiment, the protrusions 126 can be L-shaped and the openings 128 can be sized such that the L-shaped protrusions can fit through. In one embodiment, the openings 128 can be slots that can permit a first leg 130 of the L-shaped protrusions 126 to pass there through and allow a second leg 132 (the portion that extends from the base portion 118 of the securing apparatus) to extend through the opening 128. In one embodiment, at least one of the openings 128 has a flex member 134 extending laterally into the opening 128. The flex member 134 allows the first leg 130 to pass through the opening 128 and permits the second leg 136 of the protrusion 126 to move past when the securing apparatus 46 is rotated relative to the base member 120 and the external sleeve 26 of the thread protector 10, but the flex member 134 does not easily permit the rotation of the base member 120 of the securing apparatus 46 to be rotated back the other way. The external sleeve 26 of this embodiment can include a slit 136 disposed therein to provide a pry point to remove the thread protector 10 in certain situations.

A pin end 14 of the tubular member 16 can be forced into the thread protector 10 such that a sidewall 138 of the tubular member 16 ends up being positioned between the external sleeve 26 of the thread protector 10 and each U-shaped finger 112. The tapering relationship between the first leg 114 of each U-shaped finger 112 creates a situation where, depending on the thickness of the sidewall 138, the sidewall 138 of the tubular member 16 gets securely wedged between the first leg 114 of each U-shaped finger 112. The tapering relationship and the U-shape of each finger 112 creates a larger distance between the bottom 124 of each U-shaped finger 112 and the inner side 28 of the external sleeve 26, which permits easier initial engagement with the tubular member 16. As the pin end 14 of the tubular member 16 is forced into engagement with the securing apparatus 46 of the thread protector 10, outer surfaces 140 of the first legs 114 of each U-shaped finger are flattened so that more surface area of the outer surfaces 140 can contact the internal side 20 of the tubular member 16 to better secure the thread protector 10 to the tubular member 16.

In yet another embodiment of the present disclosure, a debris sleeve 142 can be used with the thread protector 10 to create a thread protection system 144. The debris sleeve 142 can be implemented to prevent moisture and debris from damaging the threads 12 of the tubular member 16. The debris sleeve 142 is designed to cover a portion of the external sleeve 26 of the thread protector 10 and the external portion of the tubular member 16 adjacent to the external sleeve 26. The debris sleeve 142 can have a wider portion 146 that covers the external sleeve 26 of the thread protector 10 and a narrower portion 148 that covers the external portion of the tubular member 16. The wider portion 146 and the narrower portion 148 can each have a channel 150 disposed therein for receiving a band 152 (or strap) that can be tightened in the channels 150 to secure the engagement of the debris sleeve 142. In one embodiment, the external sleeve 26 can include a circumferential channel 154 disposed therein for receiving the channel 150 disposed in the wider portion 146 of the debris sleeve 142. The band 152 or strap can be any type of strap or band that can be tightened.

Figure 15A:
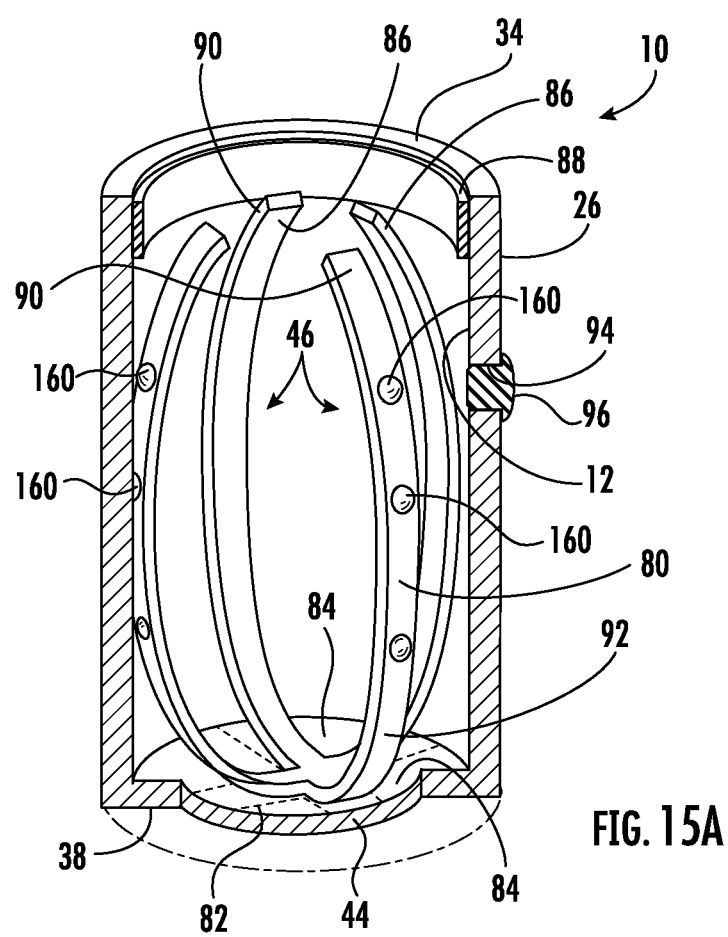
FIGS. 15A-15D are views of thread protectors incorporating magnets.
Figure 15B:
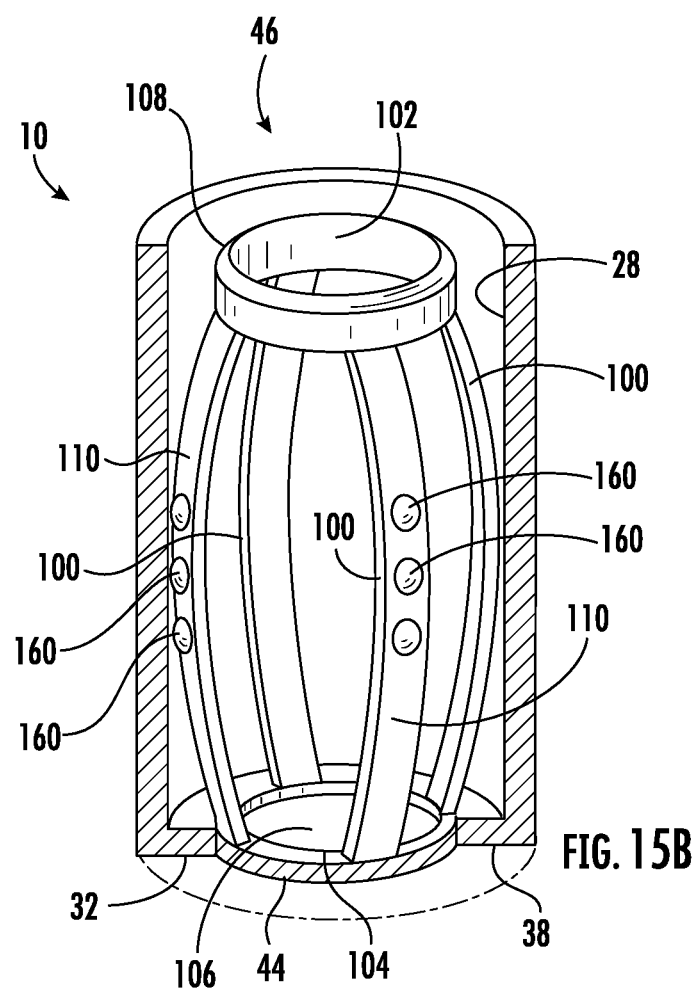
Figure 15C:
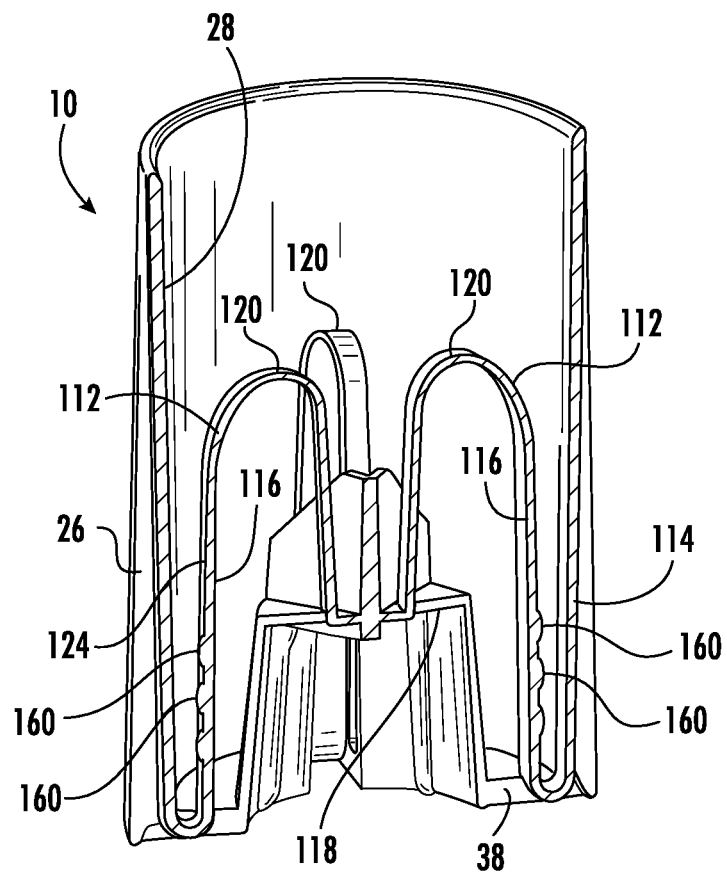
Figure 15D:
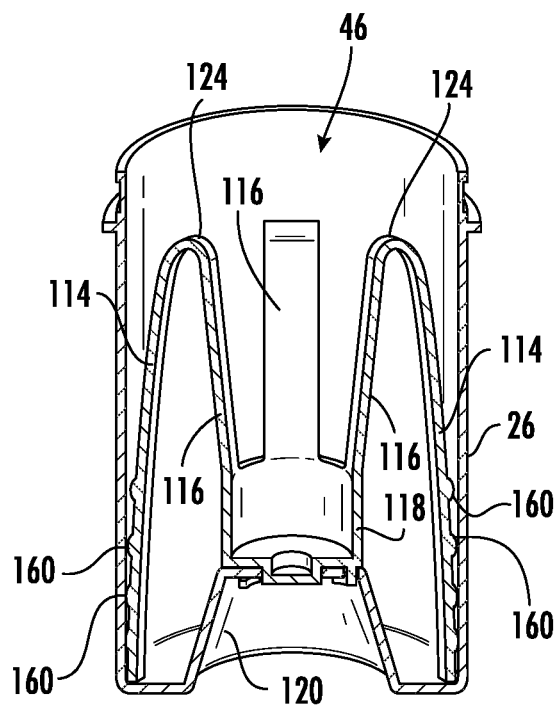
Figure 16A:
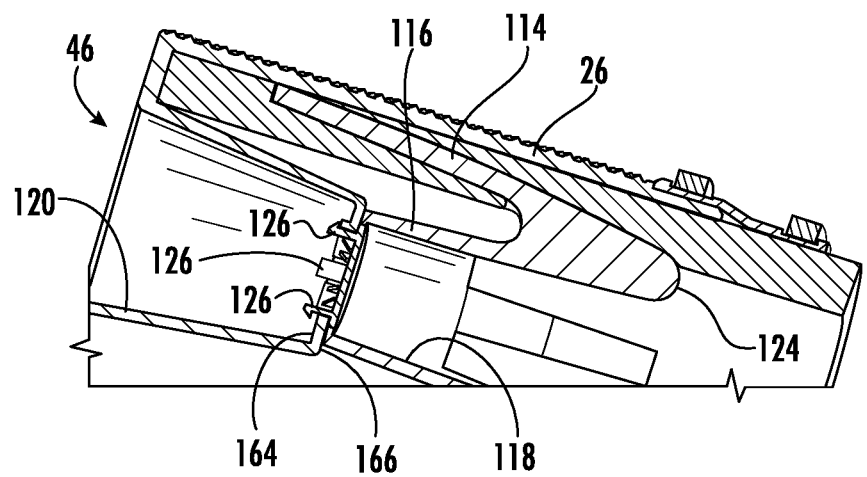
FIGS. 16A-16G are additional views of another portion of the thread protector shown in FIGS. 11A and 11B constructed in accordance with the present disclosure.
Figure 16B:
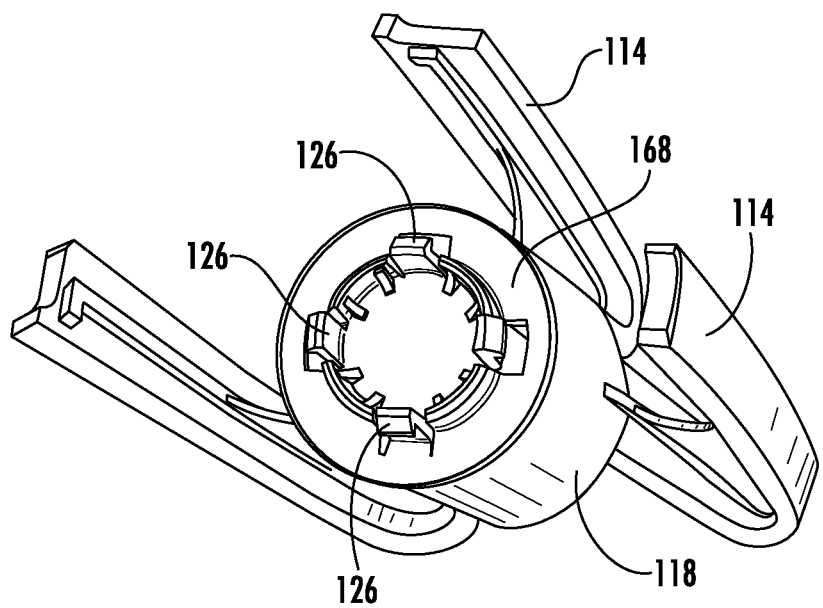
Figure 16C:
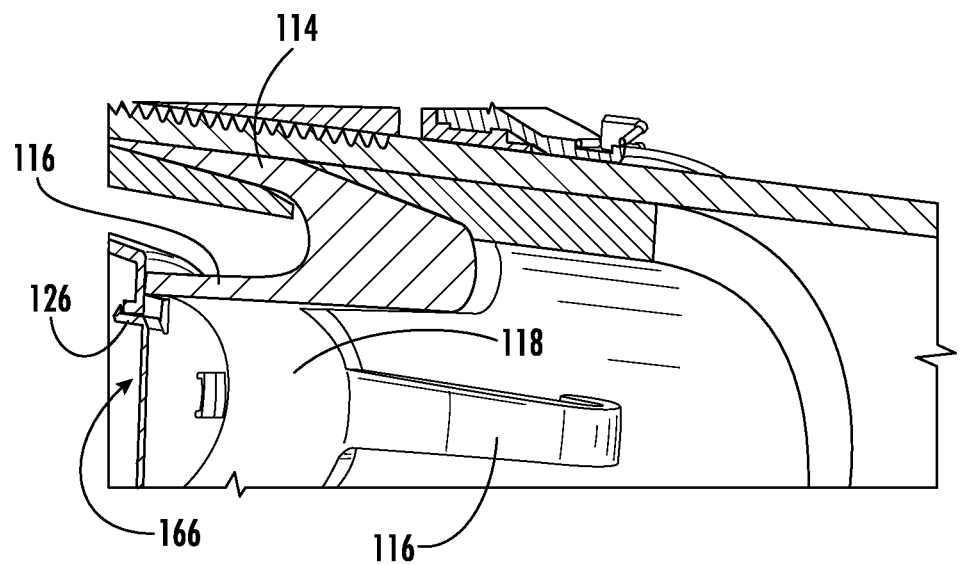
Figure 16D:
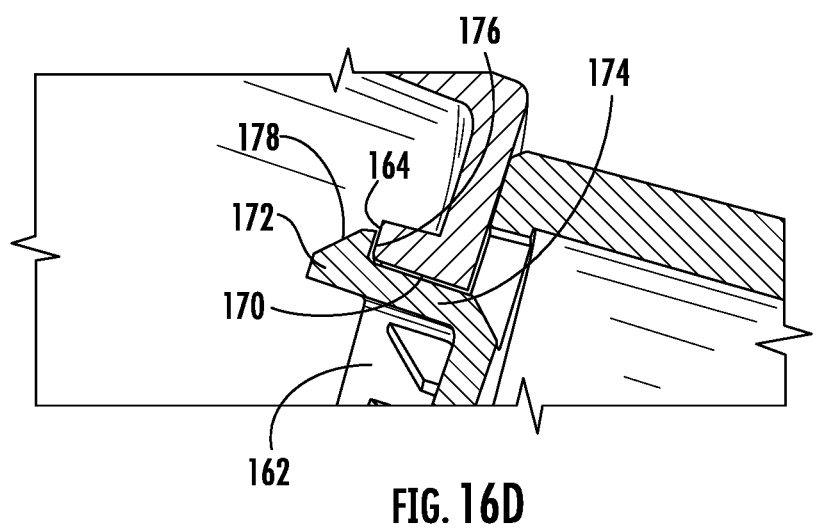
Figure 16E:
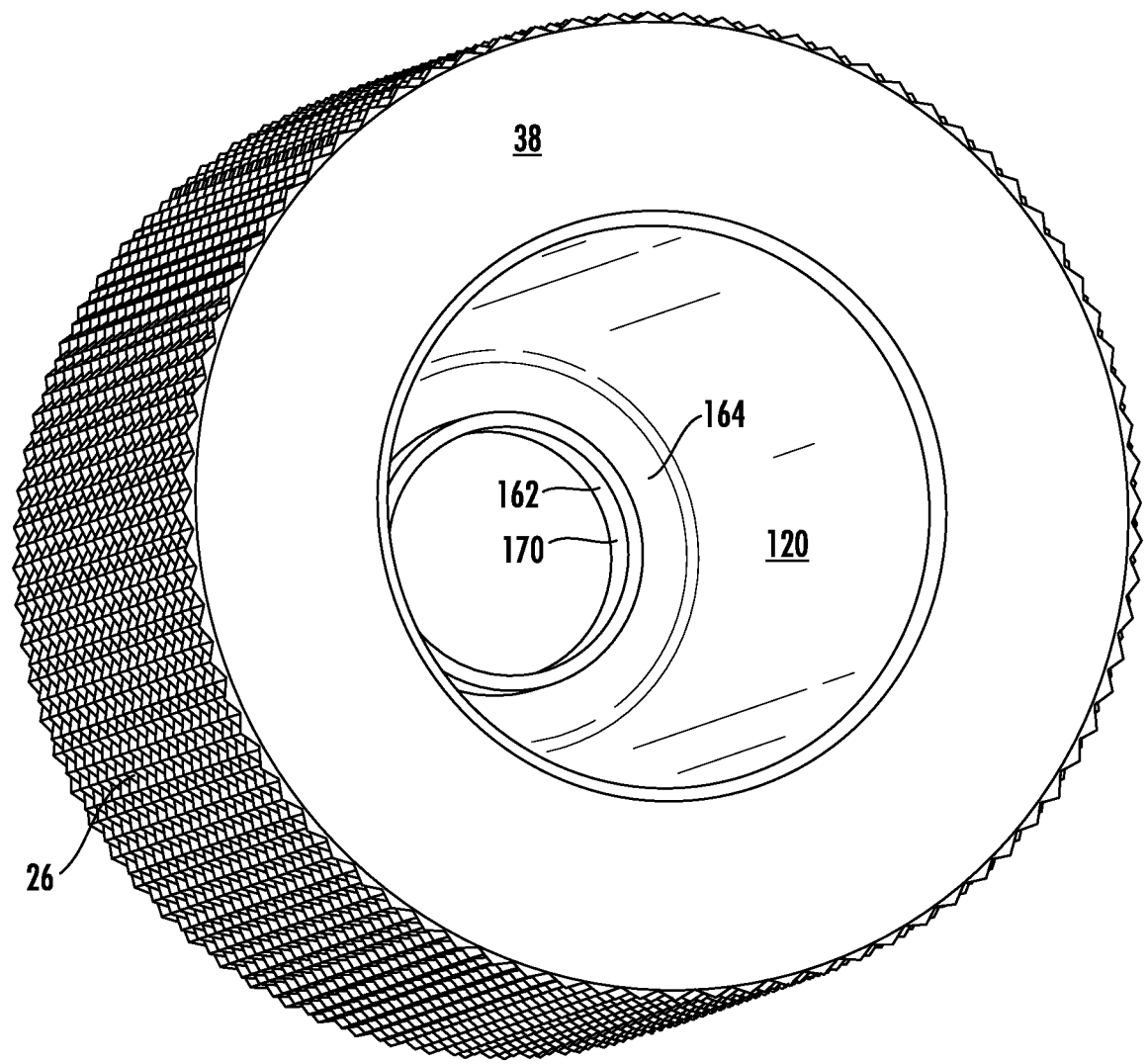
Figure 16F:
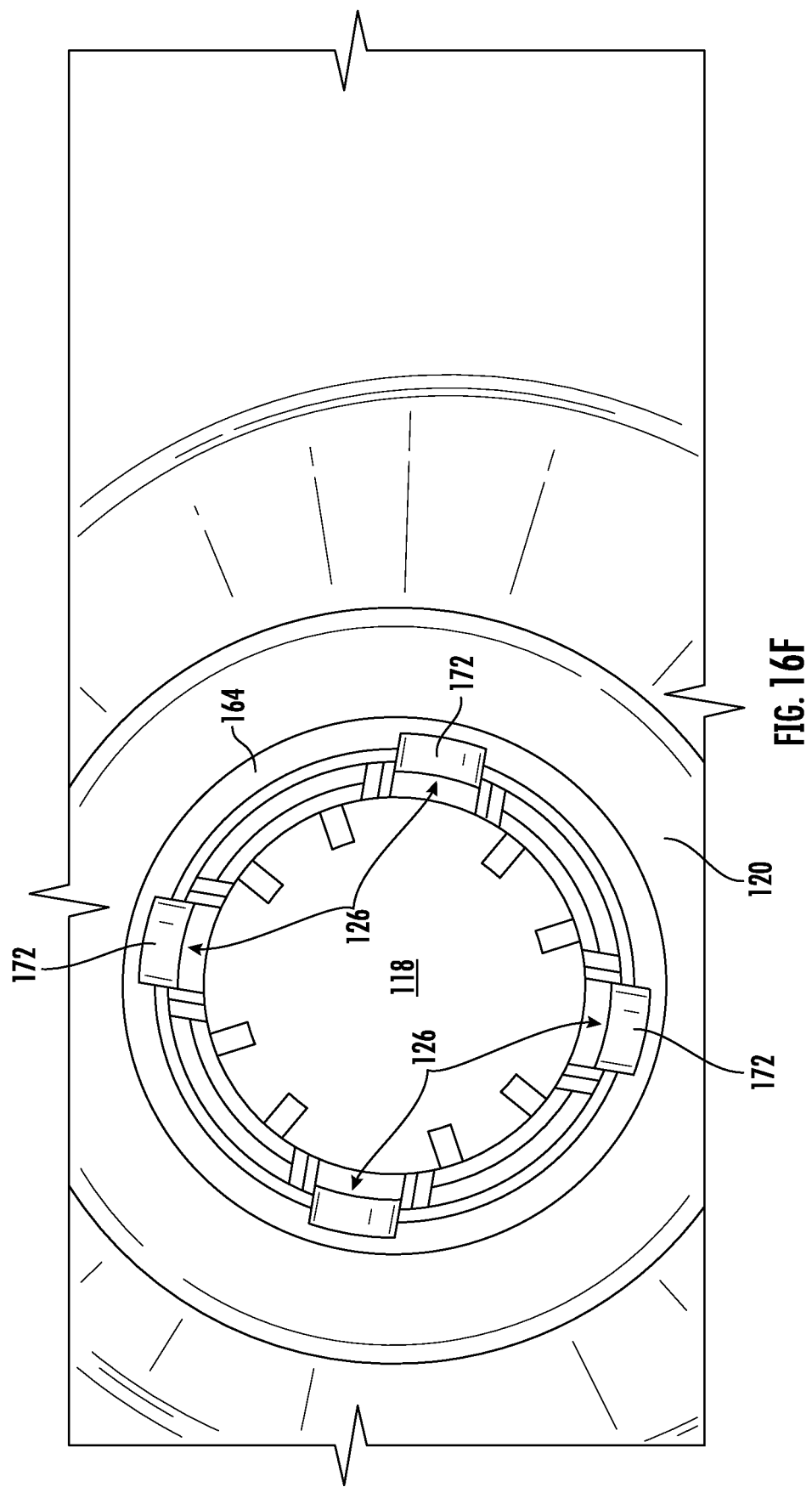
Figure 16G:
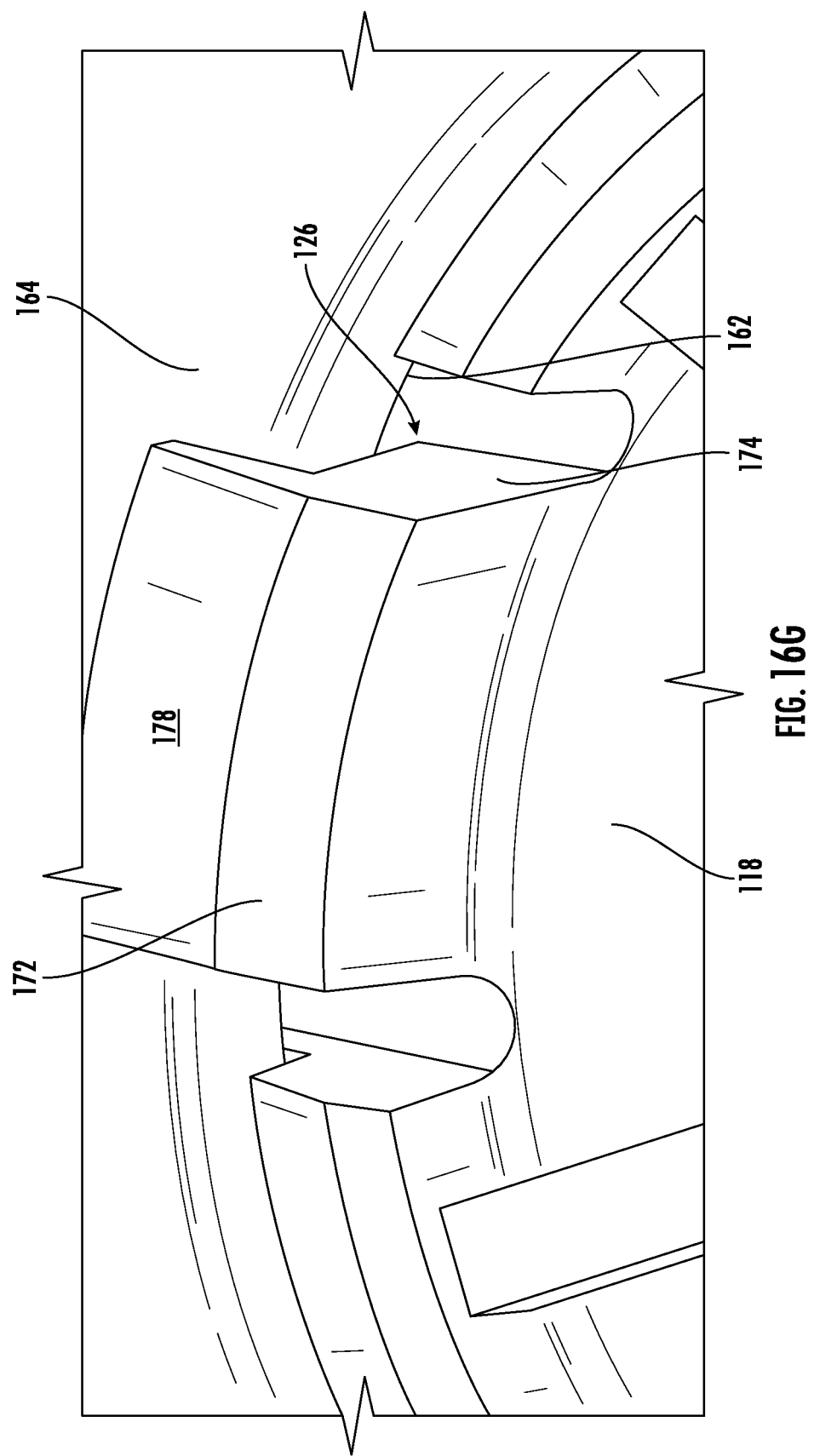

The securing apparatus 46 can also include at least one magnet 160 disposed in any portion of the securing apparatus 46 so that the magnet 160 can be attracted to the inside of the tubular member 16 and help secure the thread protector 10 to the tubular member. Each securing apparatus can include any desired number of magnets 16 or desired magnet 160 sizes so that the thread protector 10 operates as desired. The magnet 160 can be imbedded in the surface or disposed on the surface of any part of the securing apparatus 46 shown in FIGS. 4-13B. FIG. 15A shows an exemplary embodiment of the magnet 160 incorporated into the thread protector 10 shown in FIGS. 7A and 7B. FIG. 15B shows an exemplary embodiment of the magnet 160 incorporated into the thread protector 10 shown in FIGS. 8A and 8B. FIG. 15C shows an exemplary embodiment of the magnet 160 incorporated into the thread protector 10 shown in FIGS. 9A and 9B. FIG. 15D shows an exemplary embodiment of the magnet 160 incorporated into the thread protector 10 shown in FIGS. 11A-12C. Some of the Examples show the magnets 160 embedded in parts of the securing apparatus 46 and others show the magnet 160 disposed on the surface of various parts of the securing apparatus 46.

Referring now to FIGS. 16A-16G, shown therein is another embodiment of the thread protector 10 shown in FIGS. 11A-14B having a unique engagement between the base portion 118 of the securing apparatus 46 and the base member 120. In this embodiment, the base portion 118 of the securing apparatus 46 is rotatable relative to the base member 120. Similar to the embodiment shown in FIGS. 13A-14B, this permits different sized securing apparatuses 46 can be used with the thread protector 10 depending on the size of the tubular member 16 having the threads to be protected. The base portion 118 of the securing apparatus 46 can have protrusions 126 that extend therefrom that securely engage with a part of the base member 120. It should be understood that the protrusions 126 could be on the base member 120 and the part the protrusions 126 engaged with could be disposed in/on the base portion 118 of the securing apparatus 46. In one embodiment, the protrusions 126 can engage with an opening 162 disposed in the base member 120 to prevent axial separation of the base member 120 and the base portion 118, but permit the base member 120 and the base portion 118 to rotate relative to each other.

The opening 162 separates an inside part 164 of the base member 120 and an engagement side 166 that abuts an abutment side 168 of the base member 120. A sidewall 170 defines the opening 162 and has a certain depth. Each protrusion 126 can include an engaging end 172 that selectively engages the inside part 164 of the base portion 118 to secure the base member 120 and the base portion 118 in an axial direction and a post portion 174 that extends from the abutment side of the base member to the engagement end 172 of each protrusion 126. Each engagement end 172 can include a shoulder 176 that when the base member 120 and the base portion 118 are engaged, the shoulder 176 contacts the inside part 164 of the base member 120 and an angled portion 178 to permit the engagement ends 172 of be able to move up through the opening 162 and past the sidewall 170 when the base member 120 and the base portion 118 are connected. The post portion 174 is flexible which also allows the engagement end 172 of each protrusion to flex away from the sidewall 170 as the base member 120 and the base portion 118 are connected. The shoulders 176, the abutment side 168 of the base portion 118 and the post portions 174 of the protrusions 126 create a circumferential slot that accepts the sidewall 170 that creates the opening 162 and provides that area where the base member 120 and the base portion 118 will be permitted to rotate relative to each other.

The present disclosure is also directed toward a method of removing the thread protectors 10 from the tubular members 16 and using the tubular members 16 in various oil and gas operations. The method is also directed towards securing the thread protectors 10 to the tubular members 16 that are being used in the oil and gas operations.

From the above description, it is clear that the present disclosure is well-adapted to carry out the objectives and to attain the advantages mentioned herein as well as those inherent in the disclosure. While present embodiments have been described herein, it will be understood that numerous changes may be made which will readily suggest themselves to those skilled in the art and which are accomplished within the spirit of the disclosure and claims. Any elements of any embodiments disclosed herein can be combined with any of the other embodiments disclosed herein.

What is claimed is:

1. A thread protector, the thread protector comprising:
   an external sleeve to protect threads disposed on a tubular member; and a securing apparatus supported by the external sleeve to frictionally engage an inner side of the tubular member to maintain the thread protector's engagement with the tubular member, the securing apparatus including a magnet that increases the force of the frictional engagement of the securing apparatus with the inner side of the tubular member.

2. The thread protector of claim 1 wherein the securing apparatus further includes a plurality of U-shaped or bowed fingers to engage the inner side of the tubular member.

3. The thread protector of claim 2 wherein the magnet could be disposed on an outer surface of each the U-shaped fingers or bowed fingers.

4. The thread protector of claim 2 wherein the magnet is embedded inside the U-shaped fingers or bowed fingers.

5. A thread protector, the thread protector comprising:
   an external sleeve to protect threads disposed on a tubular member; and
   a securing apparatus supported by the external sleeve to frictionally engage an inner side of the tubular member to maintain the thread protector's engagement with the tubular member, the securing apparatus rotatable relative to the external sleeve.

6. The thread protector of claim 5 wherein a base portion of the securing apparatus engages a base member supported by the external sleeve.

7. The thread protector of claim 6 wherein the base portion can include protrusions extending therefrom that can securingly engage a sidewall that defines an opening in the base portion and an inside part of the base portion.

8. The thread protector of claim 7 wherein each protrusion includes a post portion and an engagement end, the engagement end includes a shoulder and an angled part, the shoulder engages with the inside part of the base portion.

9. The thread protector of claim 8 wherein a circumferential groove is created by the post portions and shoulders of the protrusions and an abutment side of the base member.

10. A method of protecting pin threads of ends of tubular members, the method comprising:
    installing a thread protector on an end of a tubular member to protect threads disposed on end of the tubular member, the thread protector comprises:
    an external sleeve to protect threads disposed on a tubular member; and
    a securing apparatus supported by the external sleeve to frictionally engage an inner side of the tubular member to maintain the thread protector's engagement with the tubular member, the securing apparatus including a magnet that increases the force of the frictional engagement of the securing apparatus with the inner side of the tubular member.

11. The method of claim 10 wherein the securing apparatus further includes a plurality of U-shaped or bowed fingers to engage the inner side of the tubular member.

12. The method of claim 11 wherein the magnet could be disposed on an outer surface of each of the U-shaped fingers or the bowed fingers.

13. The method of claim 11 wherein the magnet is embedded inside the U-shaped fingers or the bowed fingers.

14. A method of protecting pin threads of ends of tubular members, the method comprising:
    installing a thread protector on an end of a tubular member to protect threads disposed on end of the tubular member, the thread protector comprises:
    an external sleeve to protect threads disposed on a tubular member; and
    a securing apparatus supported by the external sleeve to frictionally engage an inner side of the tubular member to maintain the thread protector's engagement with the tubular member, the securing apparatus rotatable relative to the external sleeve.

15. The method of claim 14 wherein a base portion of the securing apparatus engages a base member supported by the external sleeve.

16. The method of claim 15 wherein the base portion can include protrusions extending therefrom that can securingly engage a sidewall that defines an opening in the base portion and an inside part of the base portion.

17. The method of claim 16 wherein each protrusion includes a post portion and an engagement end, the engagement end includes a shoulder and an angled part, the shoulder engages with the inside part of the base portion.

18. The method of claim 17 wherein a circumferential groove is created by the post portions and shoulders of the protrusions and an abutment side of the base member.

* * * * *